US011176140B2

(12) United States Patent
Martin et al.

(10) Patent No.: US 11,176,140 B2
(45) Date of Patent: Nov. 16, 2021

(54) UPDATING A TABLE USING INCREMENTAL AND BATCH UPDATES

(71) Applicant: INTERNATIONAL BUSINESS MACHINES CORPORATION, Armonk, NY (US)

(72) Inventors: Daniel Martin, Stuttgart (DE); Knut Stolze, Hummelshain (DE); Jens Müller, Stuttgart (DE); Sabine Perathoner-Tschaffler, Boeblingen (DE); Felix Beier, Haigerloch (DE); Einar Lueck, Filderstadt (DE)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 16/449,674

(22) Filed: Jun. 24, 2019

(65) Prior Publication Data

US 2020/0034365 A1 Jan. 30, 2020

(30) Foreign Application Priority Data

Jul. 30, 2018 (GB) ..................................... 1812375

(51) Int. Cl.
*G06F 16/00* (2019.01)
*G06F 16/2455* (2019.01)
(Continued)

(52) U.S. Cl.
CPC .... *G06F 16/24554* (2019.01); *G06F 16/2282* (2019.01); *G06F 16/2358* (2019.01); *G06F 16/2458* (2019.01); *G06F 16/258* (2019.01)

(58) Field of Classification Search
None
See application file for complete search history.

(56) References Cited

U.S. PATENT DOCUMENTS 7,788,225 B2 * 8/2010 Fish ..................... G06F 16/273
707/624
7,962,458 B2 * 6/2011 Holenstein .......... G06F 16/2343
707/704

(Continued)

OTHER PUBLICATIONS

IBM "IBM DB2 Analytics Accelerator for z/OS", https://www.IBM.com/us-en/marketplace/db2-analytics-accelerator printed May 10, 2019, p. 1.

(Continued)

*Primary Examiner* — Farhan M Syed
(74) *Attorney, Agent, or Firm* — Kristofer L. Haggerty

(57) ABSTRACT

The invention relates to computer-implemented method for updating a target table with changes introduced into a source table. New data records are stored into partitions of the source table. An incremental update module copies the new data records from the source table into the target table, thereby assigning a new target partition ID contained within a first value domain to each copied data record. A view specifies a set of visible partition IDs as a union of the first value domain and of a current target partition ID set and allows the execution of database queries selectively on target table partitions having assigned a target partition ID that is element of the visible partition ID set. A batch update module performs an atomic batch update operation that comprises copying partitions of the source table into a respective new partition in the target table.

20 Claims, 10 Drawing Sheets

(51) Int. Cl.
*G06F 16/2458* (2019.01)
*G06F 16/22* (2019.01)
*G06F 16/23* (2019.01)
*G06F 16/25* (2019.01)

(56) References Cited

U.S. PATENT DOCUMENTS

| | | | | |
|---|---|---|---|---|
| 8,301,593 B2* | 10/2012 | Hoffmann | ............ | G06F 11/2097 |
| | | | | 707/615 |
| 8,688,622 B2* | 4/2014 | Willson | ................ | G06F 16/254 |
| | | | | 707/600 |
| 10,585,876 B2* | 3/2020 | Brodt | .................. | G06F 16/2365 |
| 2006/0212465 A1* | 9/2006 | Fish | .................... | G06F 11/2097 |
| 2009/0313311 A1* | 12/2009 | Hoffmann | ........... | G06F 11/2097 |
| 2010/0191884 A1* | 7/2010 | Holenstein | .......... | G06F 11/2094 |
| | | | | 710/200 |
| 2012/0150791 A1* | 6/2012 | Willson | ................ | G06F 16/254 |
| | | | | 707/600 |
| 2017/0293530 A1* | 10/2017 | Brodt | .................. | G06F 16/2365 |

OTHER PUBLICATIONS

Wikipedia, "IBM DB2 Family",https://en.wikipedia.org/wiki/IBM_DB2, printed May 10, 2019, pp. 1-7.
Wikipedia, "Multi-Version Concurrency Control", https://en.wikipedia.org/wiki/Multiversion_concurrency_control, printed May 10, 2019, pp. 1-4.
Wikipedia, "Netezza", https://en.wikipedia.org/wiki/Netezza, printed May 10, 2019 pp. 1-4.
Wikipedia, "Replication (Computing)".printed May 10, 2019, pp. 1-7.
Maksimovic, "Overview of the Connector Tuning Optimization of Fetch, Lookup and Operations", IBM Developer, Tuning the Oracle Connector performance in IBM InfoSphere DataStage, Part 1, Mar. 28, 2013, pp. 1-36.
GB application, application No. GB 1812375.2, filed Jul. 30, 2018.

* cited by examiner

UPDATING A TABLE USING INCREMENTAL AND BATCH UPDATES

BACKGROUND

The present invention relates to database management systems (DBMSs), and more specifically to the propagation of changes introduced in a source database table to a target database table.

In the context of DBMSs, data often needs to be copied from one location to another, e.g. for creating data backups, for allowing parallel processing of a particular data set, for ensuring that all users and user devices in a distributed computer system can share the same level of information, for delegating some data processing tasks to a different hardware or software framework that is particularly suited for the execution of these particular tasks, and many other use case scenarios. The data is copied from one data source to one or more data targets such that each of the data targets represents an up-to-date copy of the data contained in the data source.

Often, batch updates are employed for keeping the target in sync with the data source. Batch updates are typically very fast, because the connection and setup overhead for inserting a single row is the same for a set of rows and the creation of transactional locks for individual data rows is avoided. However, during two batch updates, the target system is not up to date.

Incremental backups, on the other hand, are able to keep the source and the target database in sync with only minimum delay. However, the significant computational overhead involved with the propagation of each write transaction from the source to the target database may render incremental backups unsuited for many use case scenarios, in particular where the data source is updated frequently. Furthermore, many types of DBMS used as the data target and/or data source may not natively support atomicity of data changes provided during an incremental backup. Hence, there is a risk that any system failure during the data replication results in an inconsistent, corrupt version of the data set stored in the data target.

SUMMARY

The invention relates to a computer-implemented method, computer program product and corresponding computer system for updating a target table with changes introduced into a source table as specified in the independent claims. Embodiments of the invention are given in the dependent claims. Embodiments of the present invention can be combined freely with each other if they are not mutually exclusive.

In one aspect, the invention relates to a computer-implemented method for updating a target table with changes introduced into a source table. The target table is managed by a database management system (DBMS). The source table comprises a plurality of partitions respectively having assigned a source partition ID. The method comprises:

storing one or more new data records in one or more partitions of the source table;

copying, by an incremental update module, the new data records from the source table into the target table, thereby storing a respective new data record in the target table in association with a new target partition ID, whereby each target partition ID is contained within a first value domain;

providing a view for the target table, the view specifying a set of visible partition IDs as a union of the first value domain and of a current target partition ID set, the current target partition ID set selectively comprising the IDs of the ones of the target table partitions respectively comprising the most recent version of a respective source table partition, the view allowing execution of database queries selectively on target table partitions having assigned a target partition ID that is element of the visible partition ID set;

performing, by a batch update module, an atomic batch update operation. The batch update operation comprises: copying all data records of one or more partitions of the source table into a respective new partition in the target table, and assigning to each new partition of the target table created during the batch update operation a new target partition ID, whereby each of said target partition IDs is contained within a second value domain that is disjoint from the first value domain; and updating the target table and the view such that target table partitions representing an outdated version of one of the one or more source table partitions as well as all data records of the one or more source table partitions copied by the incremental update module are invisible for future database queries using the view.

According to some embodiments, the updating of the target table and the view comprises identifying all data records in the target table having assigned a partition ID contained in the first value domain; deleting the identified data records from the target table; and updating the view such that the set of visible partition IDs is a union of the first value domain and of an updated CTTP ID set ("current target table partition ID set"), the updated CTTP ID set comprising the target partition IDs created in a batch update operation, the updated CTTP ID set being free of target table partition IDs whose respective target table partitions represent outdated versions of the one or more source table partitions.

According to alternative embodiments, the updating of the target table and the view comprises identifying all data records in the target table having assigned a partition ID contained in the first value domain; replacing the partition-ID assigned to the identified data records with a partition ID of one of the target table partitions representing an outdated version of the corresponding source table partition; and updating the view such that the set of visible partition IDs is a union of the first value domain and of an updated CTTP ID set, the updated CTTP ID set comprising the target partition IDs created in a batch update operation, the updated current target partition ID set being free of target table partition IDs whose respective target table partitions represent outdated versions of the one or more source table partitions.

In a further aspect, the invention relates to a computer program product for updating a target table with changes introduced into a source table. The target table is managed by a DBMS. The source table comprises a plurality of partitions respectively having assigned a source partition ID. The computer program product comprises a computer readable storage medium having program instructions embodied therewith. The program instructions are executable by a processor to cause the processor to execute a method comprising:

storing one or more new data records in one or more partitions of the source table;

copying, by an incremental update module, the new data records from the source table into the target table, thereby storing a respective new data record in the target table in association with a new target partition ID, whereby each target partition ID is contained within a first value domain;

providing a view for the target table, the view specifying a set of visible partition IDs as a union of the first value domain and of a current target partition ID set, the current target partition ID set selectively comprising the IDs of the ones of the target table partitions respectively comprising the most recent version of a respective source table partition, the view allowing execution of database queries selectively on target table partitions having assigned a target partition ID that is element of the visible partition ID set;

performing, by a batch update module, an atomic batch update operation. The batch update operation comprises: copying all data records of one or more partitions of the source table into a respective new partition in the target table, and assigning to each new partition of the target table created during the batch update operation a new target partition ID, whereby each of said target partition IDs is contained within a second value domain that is disjoint from the first value domain; and updating the target table and the view such that target table partitions representing an outdated version of one of the one or more source table partitions as well as all data records of the one or more source table partitions copied by the incremental update module are invisible for future database queries using the view.

In a further aspect, the invention relates to a computer system comprising a source table, a target table, a DBMS adapted to manage the target table, an incremental update module, a batch update module and a database view.

The source table comprises a plurality of data records and is partitioned into multiple source table partitions respectively having assigned a source partition ID.

The target table comprises a plurality of data records created by updating the target table with changes originally introduced into the source table.

The incremental update module is configured to copy new data records from the source table into the target table, thereby storing a respective new data record in the target table in association with a new target partition ID. Thereby, each target partition ID is contained within a first value domain.

The view is a database view provided for the target table. The view specifies a set of visible partition IDs as a union of the first value domain and of a current target partition ID set. The current target partition ID set selectively comprises the IDs of the ones of the target table partitions respectively comprising the most recent version of a respective source table partition. The view allows execution of database queries selectively on target table partitions having assigned a target partition ID that is element of the visible partition ID set.

The batch update module is configured to perform an atomic batch update operation. The atomic batch update operation comprises: copying all data records of one or more partitions of the source table into a respective new partition in the target table, and assigning to each new partition of the target table created during the batch update operation a new target partition ID, whereby each of said target partition IDs is contained within a second value domain that is disjoint from the first value domain; and updating the target table and the view such that target table partitions representing an outdated version of one of the one or more source table partitions as well as all data records of the one or more source table partitions copied by the incremental update module are invisible for future database queries using the view.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
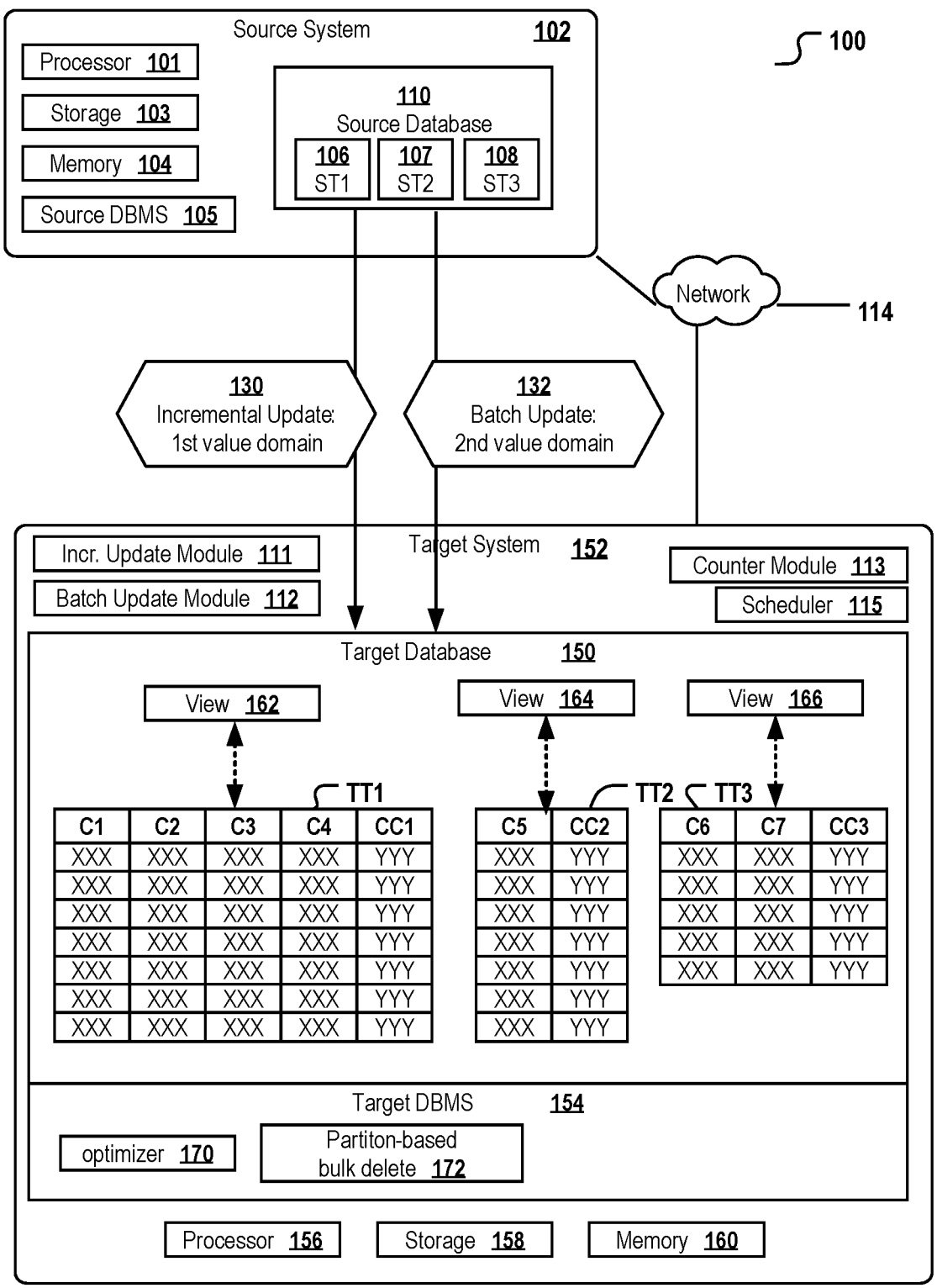
FIG. 1 depicts a system comprising target tables receiving data changes applied in respective source tables.

Embodiments of the invention may be advantageous for multiple reasons: large amounts of changes which have been introduced in the source table can be propagated to the target table with low computational overhead using the batch update module. Nevertheless, the data in the target table does not become outdated during the time interval between two batch updates, because changes that occur during this time interval are almost instantly propagated to the target table using the incremental updating module. Although two different update approaches are used, and although both update approaches can basically operate independent of each other, the data in the target table that is miscible to queries operating on the target table is always in a consistent state. This is because the partition IDs which are assigned to data records which are copied via the incremental update module on the one hand and the partition IDs which are assigned to data records which are copied via the batch update module on the other hand belong to different value domains. This allows to ensure that it is possible to identify individual rows in the target table which represent duplications of a single row in the source table. Such duplications may occur if a row in the source table is copied to the target table by the incremental update module and by the batch update module. In particular, the method involves updating a particular database view that is assigned to the target table such that queries operating on the view can only "see" and access data records in the target table which represent the most recent version of the respective data record in the source table and without retrieving duplicates of a source table row that may be contained in the target table due to the combined use of the incremental and the batch update module.

That the batch update operation involving the storing of replicated table partitions in the target table and the updating of the database view and is performed as an atomic operation may be advantageous, because any query that currently operates on the database view assigned to the target table will not "see" the new data records in the target table provided by said batch update operation until said operation has committed. Before the batch update operation can commit, not only the copy of the source table partitions are stored in the target table, but also the set of partition IDs of the target table that are contained in the set of "visible partition IDs" of the view is updated. This updating of the target table as well as of the set of visible partition IDs defined in the database view assigned to the target table within the atomic batch update operation ensures that any query that uses the view for accessing the data in the target table will not "see" outdated copies of source table partitions and source table rows that may be contained in the target table.

Furthermore, although the batch update operation takes into account the existence of rows in the target table having been created by the incremental batch update module when updating the partition ID set specified in the view, the batch update operation is computationally cheap and can be performed very quickly without interfering with ongoing queries operating on the target table using the view. This is because new data records of a currently executed, not yet committed batch update operation are not reflected in the partition ID set of the view and are hence not "seen" by queries which are accessing the target table while the batch update operation is performed. The other part of the batch update operation, the updating of the view, is also computationally cheap, because it involves only the updating of a particular database view. This can be done without locking and logging individual rows in the target table and hence does also not interfere with concurrent queries operating on the target table. After the batch update operation has committed, any database query received later will use the updated version of the view and hence will not "see" data records and partitions in the target table which have become outdated as a result of the completion of the current batch update operation.

In a further beneficial aspect, using different value domains for partition IDs of rows having been created in the target table either by the batch update module or by the incremental update module may be used as an indicator of whether a particular row was inserted by a batch update or via the incremental batch update. This may ease maintenance and monitoring of the target database comprising the target table by a database developer.

As mentioned above, embodiments of the invention may have the beneficial effect that a system and method is provided that allows keeping the data content of one or more target tables in sync with the data content of one or more source tables using batch updates as well as incremental updates, thereby providing for an optimal compromise between latency times and computational load. In a further beneficial aspect, the creation and management of new partitions in the target table may allow "emulating" partition-level multi-version concurrency control (MVCC) in a target database comprising the target table even in case the DBMS used for maintaining the target database does not natively support MVCC.

A computer-implemented method for updating a target table T1T with changes introduced into a source table T1S as shown e.g. in FIG. 1 is described in the following. The target table is managed by a DBMS. The source table comprises a plurality of partitions respectively having assigned a source partition ID. The method comprises: storing one or more new data records in one or more partitions of the source table; copying, by an incremental update module, the new data records from the source table into the target table, thereby storing a respective new data record in the target table in association with a new target partition ID, whereby each target partition ID is contained within a first value domain; providing a view for the target table, the view specifying a set of visible partition IDs as a union of the first value domain and of a current target table partition ID set (CTTP ID set), the CTTP ID set selectively comprising the IDs of the ones of the target table partitions respectively comprising the most recent version of a respective source table partition, the view allowing execution of database queries selectively on target table partitions having assigned a target partition ID that is element of the set of visible partition IDs; and performing, by a batch update module, an atomic batch update operation.

The atomic batch update operation comprises: copying all data records of one or more partitions of the source table into a respective new partition in the target table, and assigning to each new partition of the target table created during the batch update operation a new target partition ID, whereby each of said target partition IDs is contained within a second value domain that is disjoint from the first value domain; and updating the target table and the view such that target table partitions representing an outdated version of one of the one or more source table partitions as well as all data records of the one or more source table partitions copied by the incremental update module are invisible for future database queries using the view.

According to embodiments, the new target partitions created in the target table are "logical" partitions (as opposed to physical partitions), as the records stored in different partitions are not stored in different table partitions but are merely logically identified as an element of a particular target table partition by means of their respectively assigned target table partition IDs.

According to embodiments, the updating of the target table and the view comprises identifying all data records in the target table having assigned a partition ID contained in the first value domain; the assignment of a partition ID of the first value domain to a row in the target table indicates that this row has been copied to the target table in an incremental update operation by the incremental update module. The updating of the target table and the view further comprises deleting the identified data records from the target table and updating the view such that the set of visible partition IDs is a union of the first value domain and of an updated CTTP ID set. The expression CTTP ID set refers to a "current target table partition ID set". The updated CTTP ID set comprises the target partition IDs created in a batch update operation and is free of target table partition IDs whose respective target table partitions represent outdated versions of the one or more source table partitions.

The "deletion based" approach mentioned above prevents any query operating on the target table from "seeing" duplicate rows which have been copied both by the incremental update module and by the batch update module. This is achieved by identifying and deleting, when performing the batch update operation, the rows which have already been copied individually by the incremental batch update module to the target table and which are derived from a source table partition that is copied, in the currently executed batch update operation, to the target table. A downside of the "deletion based" approach is that it may introduce complications if a failure occurs and the changes have to be rolled back. The DELETE statement has to be performed in the same atomic transaction of the update operation that also involves the update of the database view to ensure that all rows in the target table remain visible to ongoing queries operating on the target table and to ensure that an atomic switch happens to change the row visibility. Hence, the deletion of the identified rows in the target table is performed without any intermediate commits of individual delete statements.

The use of a view comprising the CTTP ID set as a "positive list" of target partition IDs whose respective target table partitions shall be "visible" to queries in combination with a specification of the first value range representing a target table partition ID value ranges whose respective target table partitions and target table rows shall also be "visible" to queries may be beneficial, because these features ensure that current data copied to the target table during the current batch update as well as current data copied after the commit of the current batch update by the incremental update module is visible to queries while outdated target table partitions are hidden from the queries. In the above described embodiments, the hiding in addition comprises physically deleting duplicated and potentially outdated rows from the target table during the atomic batch update.

According to alternative embodiments, the updating of the target table and the view comprises identifying all data records in the target table having assigned a partition ID contained in the first value domain; replacing the partition-ID assigned to the identified data records with a partition ID of one of the target table partitions representing an outdated version of the corresponding source table partition; and updating the view such that the set of visible partition IDs is a union of the first value domain and of an updated CTTP ID set. The updated CTTP ID set comprises the target partition IDs created in a batch update operation. The updated current target partition ID set is free of target table partition IDs whose respective target table partitions represent outdated versions of the one or more source table partitions.

The above-mentioned "row-based update approach" is based on selectively replacing the partition IDs which are assigned to data rows which have previously (before the current batch update operation started) been replicated to the target table by the incremental batch update module by another partition ID. The other partition ID indicates that these rows have become outdated. When a row is copied to the target table by the incremental update module, the new row in the target table originally has assigned a partition ID that is element of the first value domain. In the "row-based update approach", the partition ID of these identified rows are replaced by a partition ID that is not element of the first value domain. For example, the other partition IDs that replaces the partition ID of the identified rows can be element of the second value domain and can be the target table partition ID of a target table that represents a source table partition for which a newer version of its content is currently copied to the target table by the currently executed batch update operation. The effect of the replacing of the partition ID of the identified rows in the target table in combination with the updating of the set of visible partition IDs in the view is that although the target table may comprise duplicated rows (created by copying a particular source table row to the target table both by the incremental update module and by the batch update module), only one instance of the row is visible to a query using the view to access the target table, because the partition ID assigned to the target table rows provided by the incremental update module is removed from the set of visible partition IDs of the updated version of the view in case the currently executed batch update stores an up-to-date version of this row to the target table anyway. In some embodiments, the UPDATE statements replacing the partition IDs of the identified rows in the target table can be performed incrementally with intermediate commits while performing the atomic batch update operation. Using a sequence of small sized intermediate transactions and commits may significantly reduce the amount of logging and locking that has to be done for the UPDATE by the target DBMS. Thereby, the visibility of the updated rows in the target table is not impacted: the rows are visible before the set of visible partition IDs specified in the view are changed, if they are part of the most current in the target table. After the update of the view in a batch update operation that provides a newer version of this particular partition, those rows will be invisible anyway.

The above-mentioned features may be advantageous, because the replacement of the partition IDs of the first value domain with outdated target partition IDs of the second value domain corresponds to a "logical deletion" of the duplicated and potentially outdated target table rows. The logical deletion may be followed by a physical deletion of the respective rows at a later moment in time. Physically deleting rows which have already been logically deleted previously may involve less logging and locking in a DBMS than a physical deletion of individual rows which are still visible to database queries, because intermediate commit operations can be used According to embodiments, the updating of the view comprises removing, from the CTTP ID set of the view, all target table partition IDs which represent target table partitions whose content will become outdated upon a commit of the current batch update operation, thereby creating the updated CTTP ID set that is to act as the CTTP ID set of the view after the commit of the current batch update operation.

According to embodiments, the first value domain is a range of source table partition IDs that can potentially be assigned to the source table partitions. The second value domain is created by adding an offset to the lowest and highest limits of the first value domain, the offset being larger than the absolute amount of the first value domain. An example for an offset based creation of a target table partition ID is described, for example, with reference to FIG. 11.

According to other embodiments, the first value domain is a value range whose largest value is smaller than a predefined threshold value (e.g., is smaller than the threshold value "0"). The second value domain is a value range whose smallest number is above the predefined threshold value.

According to another embodiment, the first value domain is a value range whose smallest value is larger than a predefined threshold value, in particular "0", and the second value domain is a value domain whose largest number is below the predefined threshold value.

According to other embodiments, the first value domain consists of even numbers and the second value domain consisting of odd values, or vice versa.

According to embodiments, the copying of the new data records by the incremental update module is performed such that each individual new data record is replicated to the target table according to the "all or nothing principle".

According to embodiments, the method further comprises maintaining, by the batch update module, a mapping. The mapping comprises assignments of source table partition IDs and target table partition IDs. Each assignment indicates that the target table partition represents a particular version of the assigned source table partition. In addition, the mapping indicates, for each of the source table partitions, the one of the target table partitions comprising the most recent version of the source table partition.

This may be beneficial, because the information contained in the mapping may allow updating the definition of the database view during the batch updates such that it is ensured that the CTTP ID set specified in the view always selectively comprises the ones of the target table partition IDs whose respective target table partition comprise the most recent version of the data content of a particular source table partition. The mapping can be implemented, for example, in the form of a separate mapping table or in the form of additional columns of the target table.

According to embodiments, the DBMS that maintains the target table is a DBMS that lacks an inbuilt support for managing transactions in accordance with the snapshot isolation level. In addition, or alternatively, the DBMS that maintains the target table does not support multi version concurrency control.

Embodiments of the invention may allow providing partitioning functionality, such as snapshot isolation and/or MVCC functionality by means of DBMS-external tools such as a batch update module, an incremental update module, a scheduler that coordinates the action of the batch update module and the incremental update module as described herein for embodiments of the invention.

According to embodiments, the DBMS that manages the target table is a target DBMS configured to store and manage a plurality of target tables contained in a target database. The source table and a plurality of further source tables are contained in a source database and are managed by a source DBMS, The source DBMS and the target DBMS is speed-optimized for different types of queries. The method further comprises receiving, by a query dispatcher module, a query directed at the source table; analyzing, by the query dispatcher module, the received query and dispatching the analysed query to the target DBMS for execution on the target table instead of the source table without interrupting the incremental update module.

This may be beneficial, because the use of two different types of DBMS which are optimized for processing different kinds of queries may allow processing many different types of query very fast and with low computational costs. The information which one of the two types of DBMSs actually executes a query is preferably not communicated to the client system having submitted the query.

According to alternative embodiments, the source table and the target table are both managed by the same single DBMS, but the structure of the source table and the target table may be different as to allow an efficient performance of different types of queries, e.g. INSERT queries on the source table and SELECT queries on the target table.

According to embodiments, the method further comprises coordinating the batch update module and the incremental update module such that data changes introduced in the source tables in the source database are propagated to the data content of respective target tables in the target database using the batch update module at particular time intervals and using the incremental update module during the rest of the time. For example, this coordination can be implemented in a scheduling module or scheduling application program that is interoperate if both with the incremental update module and the batch update module. The coordination of the two different update modules may ensure that the data content of the target table is always in a consistent state.

According to embodiments, the particular time intervals are scheduled time intervals or are dynamically determined time intervals of low computational load of the DBMS. For example, the batch update module may perform a batch update of all partitions of the target table comprising at least one row that has been modified since the previous batch update operation. The batch update can be performed, for example, every day at midnight when the computational load of the system is low. At all other times the batch update module is inactive and the incremental update module is operated such that any modifications (INSERTS, UPDATES or DELETES) of rows in the source table are individually replicated to the target table.

According to embodiments, the view is used by database queries for accessing the data content of the target table and by the incremental update module for inserting individual data records retrieved from the source table into the target table.

According to embodiments, the method further comprises, before starting performing of the atomic batch update, checking if an incremental update process is performed by the incremental update module; if an incremental update process is determined to being performed, pausing the incremental update process and starting the performing of the atomic batch update; if no incremental update process is determined to being performed, immediately starting the performing of the atomic batch update; after completion of the atomic batch update process, resuming the paused incremental batch update, if any.

According to embodiments, the method further comprises: analyzing the frequency of write operations performed in each of the source table partitions; identifying a first and a second sub-set of source table partitions, the partitions of the first subset being subject to a higher write access frequency than the partitions of the second subset; performing, by the batch update module, a batch update of the source table partitions in the first subset more frequently than of those in the second subset.

Typically, a batch update is computational less expensive set a plurality of incremental updates. Hence, by performing the batch update of source table partitions with a high access rate ("hot source table partitions") more frequently than others source table partitions may reduce the compressional load of the system hosting the DBMS.

According to embodiments, each state of a view corresponds to a logical snapshot of the table and to a specific set of visual partition IDs that determines which ones of the data records of the target table can be accessed by a database query.

According to embodiments, the method further comprises regularly deleting, by an asynchronous deletion functionality, all data records stored in the target table in association with a partition-ID belonging to the first set of partition IDs or representing an outdated version of the data in the corresponding source table partition are deleted in a single bulk delete operation.

According to embodiments, the source table partition IDs are partition-IDs created by a source DBMS supporting table partitioning or being partition-IDs created by an application program having stored the data in the source table.

FIG. 1 depicts a system 100 configured to keep a plurality of target tables TT1, TT2, TT3 up to date by automatically propagating data changes having been introduced into respective source tables ST1 106, ST2 107, ST3 108. The system comprises a source computer system 102 and a source database 110 managed by a source DBMS 152. The source computer system comprises one or more processors 101, a non-volatile storage medium 103 and a main memory 104. The source computer system can be, for example, a standard computer, a notebook, a netbook, or a battery powered hand held mobile telecommunication device, e.g. a smartphone or a tablet computer. The source computer system can also be a server computer, e.g. a database server computer or a computer that is part of a cloud system. The source DBMS is configured to receive database queries to operate on the data contained in the source database. In some embodiments, the source DBMS supports partitioning of the source database tables 106-108. In other embodiments, the partitioning of the source database tables, e.g. for propagating changes from the source to the target database on a per-partition basis, is implemented in the application layer, e.g. by a batch update module hosted on the source computer system 102 or on the target computer system 152. Hence, in some embodiments, a source partition counter module configured to increment the partition ID when a new partition in one of the source database tables is created is part of the source DBMS. In other embodiments, it is part of the batch update module 112.

The system 100 further comprises a target computer system 152. For example, the target computer system can be a desktop computer, a standard computer, a notebook, a netbook, or a battery powered handheld mobile telecommunication device, e.g. a smart phone or tablet computer. Likewise, the target computer system can be a server computer, e.g. a database server computer or a computer that is part of a cloud system.

The target computer system 152 comprises a target database 150 managed by a target DBMS 154. For one or more of the source tables in the source database the target database comprises a respective target table to which new data records having been stored in the respective source table are copied. For example, data changes introduced to source table ST1 106 are propagated to the target table TT1. Data changes introduced to source table ST2 107 are propagated to target table TT2. Data changes introduced to source table ST3 108 are propagated to target table TT3. As a consequence, the data content of the target tables is synchronized (with some delay) with the data content of the source tables. Thereby, data that is newly stored to a source table is propagated to a respective target table by two different modules: the incremental update module 111 performs incremental updates 130, whereby changes applied to an individual row (typically corresponding to a single data record) in a source table are copied to and stored in a respective new row of a target table in a single transaction that follows the "all or nothing" principle. In addition, a batch update module 112 performs batch updates 132. In a batch update, one or more partitions of one or more source tables are copied together within a single batch update operation to one or more respective target tables such that each one of the copies of the one or more partitions of the source tables corresponds to a newly created partition in one of the target tables.

In order to ensure that the target database has a consistent state, the operation of the incremental update module 111 and of the batch update module 112 is coordinated and scheduled by a scheduling module 115. For example, the scheduling module can be configured to call the batch update module 112 for performing the batch updates at times when the system load is low, e.g. during the night times. The incremental update module 112 is put on hold by the scheduler during the time the batch update module 112 performs the batch updates. At times of heavy load, or during the normal operation times (e.g. from morning till evening), the incremental update module 112 is active. The way the two update approaches are coordinated is preferably configured on a per-table basis, but it is also possible to coordinate the two updating modules 111, 112 for each source table partition individually. This may allow to specify a speed optimized update strategy that takes into account the frequencies of read and/or write queries executed on respective source tables or source table partitions. For example, if a particular source table partition faces heavy and very frequent write operations throughout the day, it may be preferable to propagate the changes stored in this particular source table partition predominantly using the batch update approach to avoid too many and too frequent logging and locking operations of the source database table. If write operations are performed on a particular source table partition only rarely, it may be preferable to predominantly perform incremental updates.

When a new partition ("source table partition" or "source partition") is generated and stored in one of the source tables, a new source partition ID is generated and assigned to said new source partition. For example, the new source partition ID can be automatically generated by a native routine of the source DBMS or by a DBMS-external application, e.g. the batch update module 112. For example, the source partition ID can be a numerical value, a timestamp, a hexadecimal string, a transaction ID or the like. The source partition ID is created such that it is an element of a first value domain. For example, the source partition IDs can be created such that each source table partition ID is a number that is contained in a value range between one and the maximum possible number of partitions supported by the source DBMS in a given source database. Alternatively, the source partition ID can be a number smaller than zero or an alphanumerical string with a prefix, infix or suffix that is particular to the first value domain.

When a new partition ("target table partition" or "target partition") is generated and stored in one of the target tables, a new target partition ID is generated and assigned to said new target partition. The new target partition ID is not a partition ID generated natively by the target DBMS. The target DBMS may not even support partitioning. Rather, the target partition ID is created automatically by the batch update module 112. As mentioned for the source partition ID, the target partition ID can be a numerical value, a timestamp, a hexadecimal string, a transaction ID or the like. The target partition ID is created such that it is an element of a second value domain that is disjunct from the first value domain. For example, the target partition IDs can be created such that each target table partition 80 is a number that is contained in a value range whose smallest value is larger than the maximum possible number of partitions supported by the source DBMS. For example, this can be achieved by adding an offset to the source partition ID of a currently copied source partition for computing the target partition ID of the new target table partition to receive this currently copied partition. The offset can be any number larger than the maximum possible number of partitions supported by the source DBMS. This ensures that the target partition IDs are always within a value domain that can clearly be distinguished from the source table partition IDs which are not allowed to have an ID larger than the above-mentioned maximum value.

Alternatively, the target partition ID can be a number larger than zero in case the first value domain consists of negative numbers. Still alternatively, the target partition ID can be an alphanumerical string with a prefix, infix or suffix that is particular to the second value domain and allows a clear distinction from the prefix, infix or suffix used for creating the source table partition IDs as elements of the first value domain.

In the depicted distributed system 100, the source computer system 102 is connected via a network 114, e.g. the Internet or an intranet, to the target computer system 152. In other embodiments (not shown), a single source computer system can be connected to a plurality of target computer systems comprising components which are functionally identical or equivalent to the components described for the target computer system 152.

Preferably, the target DBMS 152 hosted on the target computer system 152 comprises an optimizer 170 that is configured to speed optimize database queries which are to be performed on tables contained in the target database. The source DBMS 105 may also comprise an optimizer (not shown) that is typically optimized for different types of queries which are to be performed on tables contained in the source database. For example, the source DBMS can be an OLTP DBMS optimized for performing write queries while the target DBMS can be an OLAP DBMS optimized for performing analytical read queries.

The source DBMS can be, for example, DB2 for z-OS, an Oracle database, a PostgreSQL or MySQL DBMS or the like. The source computer system preferably comprises a query dispatcher module. The query dispatcher module is configured to analyze database queries which are to be sent to the source DBMS for execution on the source database. The query dispatcher tries to predict whether the query can be executed faster or with less computational resources on the target database than on the source database. In this case, the query dispatcher forwards the database query to the target DBMS for execution. The client having submitted the query will typically not be informed of whether the query was executed on the source on the target database. In this embodiment, the publication of changes introduced in the source database to one or more target databases ensures that irrespective of whether an incoming database query is executed on the source on the target system, the obtained results will always be the same and represent a consistent state of the data.

The incremental update module 111 can be a known replication program conventionally employed for application tasks. The incremental update module 111, e.g. a conventional replication tool, it is not able to or at least does not exchange information with the batch update module 112. The incremental update module 111 is configured to read and analyze a translation log of the source DBMS in order to detect which data or modifications have been applied to rows in the source tables. Those changes are then translated to INSERT and DELETE statements against the target table maintained by the target DBMS.

According to some embodiments, a query dispatcher of the source computer system selectively uses the view 162 assigned to the target table TT1 for performing SQL queries on the target table, whereby the view is updated by the batch update module such that it is ensured that only up-to-date rows and partitions are visible to the queries. According to some embodiments, the incremental update module 111 uses the same view 162 as the query dispatcher for inserting the copies of the rows modified in the source table in the target table. According to other embodiments, the incremental update module 111 uses an identical or slightly modified duplicate of the view 162 for inserting the copies of the rows modified in the source table in the target table. Using the view 162 that defines the visibility of target partitions and that is updated upon every batch update operation by the incremental update module for performing in said operation and the target table may be advantageous, because it is guaranteed that the incremental updates modify the latest version of all rows and partitions.

The program modules 111, 112, 113, 115 may be written in Java, in C++ or any other programming language. The counter module 113 can be implemented as a sub-module of the batch update module and can be configured such that it automatically increments by one unit each time the batch update module creates and stores a new partition in one of the target tables.

Figure 2:
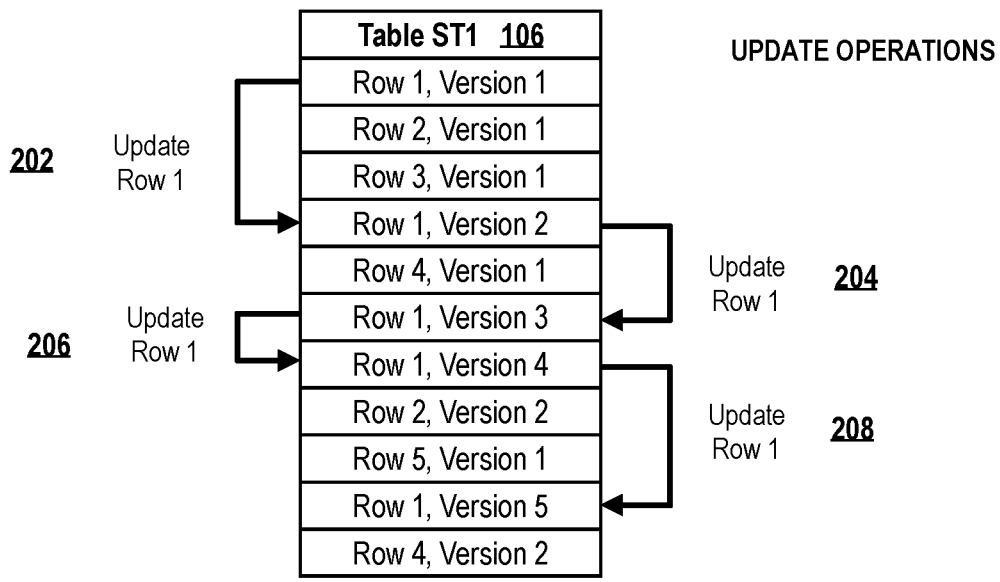
FIG. 2 depicts the creation of new versions of a data record upon a data record update operation.

FIG. 2 depicts the creation of new versions of a data records upon a data record write operation (UPDATE or INSERT) in the source table ST1 106 in greater detail. For illustration purposes, only the version of the data record is reflected, not its data content. The source DBMS as well as the target DBMS is configured not to modify any existing data record upon performing an UPDATE statement. Rather, the source DBMS and the target DBMS are configured to create a new version of the row on every such UPDATE modification rather than applying data modifications of a row in-place. For example, the first update operation 202 executed on row 1 version 1 results in the creation of a new row 1 version 2. A further update operation 204 executed on row 1 version 2 results in the creation of a new row 1 version 3. A further update operation 206 executed on row 1 version 3 results in the creation of a new row 1 version 4. A still further update operation 208 executed on row 1 version 4 results in the creation of a new row 1 version 5.

A problem associated with many types of DBMS is that they do not natively support multi-version concurrency control (MVCC). For example, DB2 LUW does not implement MVCC internally. Rather, they use block-based concurrency control which is computationally demanding and which may lead to significant delays when performing queries in a database due to various locks. The incremental update module as well as the batch update module according to embodiments of the invention are configured such that any UPDATE statement to be executed on a data record in the source database is propagated to the target database such that a new data record is created in a target table, whereby the partition-ID assigned to the new data record in the target table acts as a kind of version ID and indicates that a new, modified/updated version of a particular data record in the source database was now replicated to and stored in the target database. The prior existing row remains, but is implicitly marked by its assigned target partition ID in combination with the view as "logically deleted" in the target database, because target table rows having assigned an ID of an outdated partition ID cannot be accessed by a query via the view, because the view specifies a set of "visible" partition ID that selectively comprises the partition IDs of target table partitions which represent the most current version of a respective partition. In addition, each INSERT operation produces a new row in the source table as well as in the respective target table. Hence, embodiments of the invention provide for a target DBMS that is updated such that a MVCC functionality of the target DBMS is "simulated" although the target DBMS may not natively support MVCC functionality. Hence, embodiments of the invention may allow updating the target database without using the conventional lock-based concurrency control mechanisms that are usually used as an alternative to DBMS-internal MVCC functionalities for providing concurrency control. Thereby, the content of the target database is completely or at least partially synchronized with the data content of the source database without significantly slowing down the performance of the source and/or the target system and even in case the target DBMS does not natively support MVCC functionality.

In other words, MVCC functionality of the target DBMS is implemented and "emulated" according to embodiments of the invention by automatically assigning partition IDs to data rows having been copied individually or as an element of a copied table partition to the target table, whereby the value domain of the assigned target table partition ID depends on whether the row was copied individually by the incremental update module or as part of a partition by the batch update module, and by updating a database view used to access the target table such that rows having an outdated data content are invisible to the queries. The use of partition IDs of different value domains by the different update modules 111, 112 may allow identifying outdated rows and outdated table partitions in the target table even in case two independent update modules 111, 112 are used for propagating changes from the source to the target database.

A special case is a situation where all partitions of the source table are to be updated. In this case is possible to create a new table in the target database to which all rows are copied, and the view definition is changed to refer to that new table.

Figure 3:
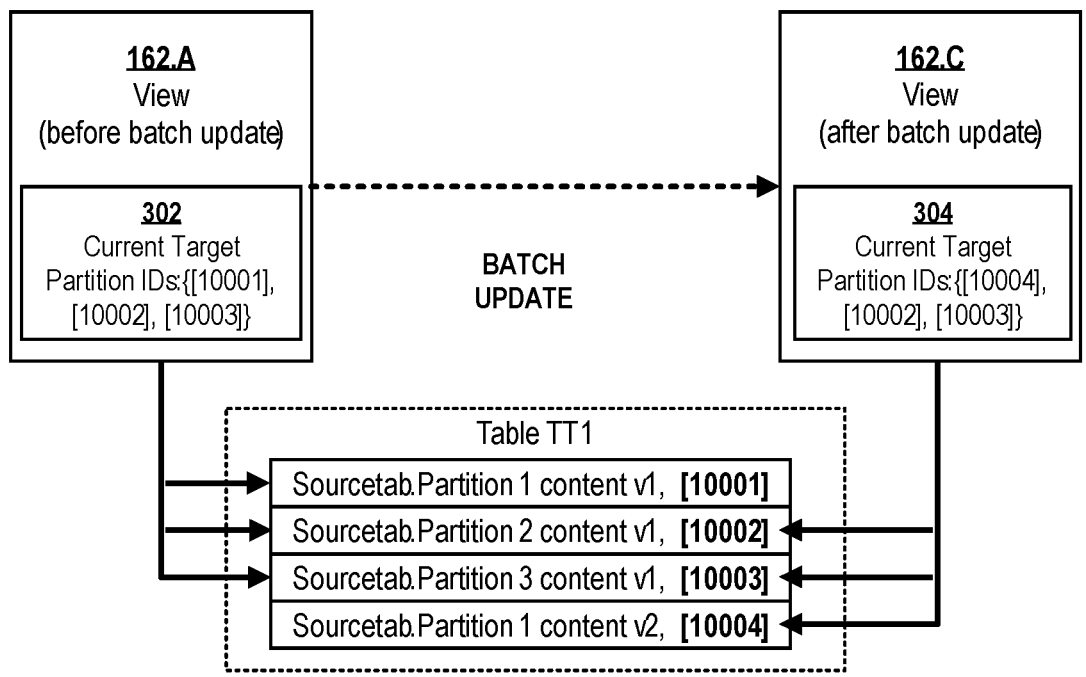
FIG. 3 depicts two states of a view respectively representing a snapshot of a target table before and after an atomic batch update operation.

FIG. 3 depicts two states of a view 162 respectively representing a snapshot of a target table TT1 before 162.A and after 162.B an atomic batch update operation has committed. The figure illustrates that the visibility of rows and partitions contained in the target table switches instantly simply by changing the view definition. Switching the visibility of rows and partitions by updating a view definition as part of a batch update operation may have the advantage that updating the view is computationally cheap. Moreover, atomically switching visibility by changing the view definition allows for incrementally adding new versions of data records and even committing portions of a currently executed batch update operation intermittently without affecting the visibility of rows which are currently accessed by queries concurrently executed while the atomic batch update is running.

A first point in time, the source table ST1 may consist of three source table partitions having the source table partition IDs "1", "2" and "3". Each of the three cells table partitions may correspond to a first version of the data stored therein. The data of the three partitions of the source table has been completely copied to the target table TT1 by the batch update module. As a consequence, the target table comprises a first partition having target table partition ID 10001 and comprising the data content of source table partition 1 (version 1). The target table further comprises a second partition having target table partition ID 10002 and comprising the data content of source table partition 2 (version 1) and 1/3 partition having the target table partition ID 10003 and comprising the data content of source table partition 3 (version 1). The database view 162.A comprises a set of current target partition IDs 302 comprising, at this first point in time, the target table partition IDs [10001], [10002], [10003]. The visibility of the individual target table partitions by queries using the view 162.A is also illustrated by the arrows selectively pointing at partitions visible to respective queries using the view 162.A. At the first point in time, the fourth target table partition having partition ID [10004] does not yet exist in the target table TT1.

Then, one or more rows of the first partition may be updated in the source database. As a consequence, new versions of the rows may be created in the source table which can be stored in a new, additional partition in the source database. Alternatively, the source DBMS does not support partitioning, but all data rows in the source table having been created later than the last batch update was performed are considered to be part of a new, "logical" partition of the source database. The content of the new source table partition represents an updated (second) version of the content of the first cells table partition "1".

Then, the batch update module starts performing an atomic batch update operation. The batch update operation comprises copying the data content of the newly created source table partition (comprising the updated version of source table partition "1") into a new partition of the target table. The batch update module assigns a new target partition ID [10004] to the new partition in the target table. At this moment, the data content of the source table partition one version 2 is already stored physically in the target table but cannot be "seen" by concurrently executed queries, because the batch update operation has not yet modified the set of current target partition IDs 302 and target partition ID [1004] is not contained in this set 302.

In a next step, the batch update module updates the specification of the view 162 and creates a new version 162.C of the view. The new version comprises an updated set 304 of current target partition IDs in which the target partition ID [10001] is replaced by the new target partition ID [10004]. The target partition ID [10001] was removed because both partitions [10001] and [10004] correspond to the same source table partition "1" but [10001] will represent an outdated version of this source partition "1" once the currently performed atomic batch update operation has committed. By replacing the target partition ID [10001] with [10004] in the view definition while performing the atomic batch update operation, it is ensured that the view 162 only declares those target partition IDs as "visible" which represent the most current version of the data content of a respective source table partition.

The new version 162.C of the database view replaces the old version 162.A instantly upon a commit event of the atomic batch update operation.

As mentioned before, the atomical switching of the visibility by changing the view definition allows for incrementally adding new versions of data and even committing portions of the batch update intermittently without affecting currently visible rows. Changing the definition of a view is an atomic and fast operation. In a further beneficial aspect, SQL statements currently accessing the view can be analyzed and the view definition can be incorporated into SQL statements during compilation and optimization of the final database query to be executed by the target DBMS. The compiled database query remains unchanged while the statement is being executed-even if the view definition changes concurrently. As a consequence, stable and consistent results for the compiled database query are guaranteed.

Preferably, rows and partitions of the target table having assigned an "invisible" partition ID should be deleted physically at some point. In some embodiments the physical deletion can be performed as a sub-operation of the atomic batch update operation. In other embodiments, the physical delete may be implemented differently (e.g. as described in US 20170293530A1) or there may be no physical delete in the target table at all.

Figure 5:
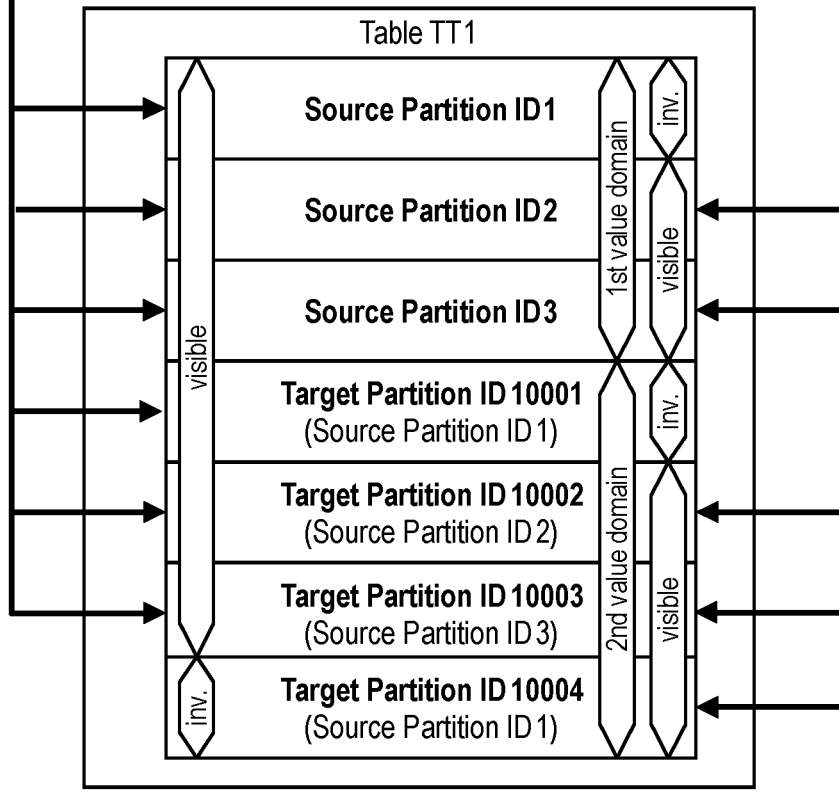
FIG. 5 depicts two states of a view respectively representing a snapshot of a target table comprising also incrementally replicated rows before and after an atomic batch update operation for target partition ID 10004.

FIG. 3 illustrates the situation where all data rows in the target table have been provided by the batch update module 112, not by the incremental batch update module 111. As a consequence, all target partition IDs depicted in FIG. 3 belong to the second value domain generated by the batch update module 112. A more complex situation when the content of the target table consists of a mixture of rows provided by the batch update module 112 and having assigned a target partition ID of the second value domain and of rows provided by the incremental update module 111 and having assigned a target partition ID of the first value domain is depicted in FIG. 5.

Figure 4:
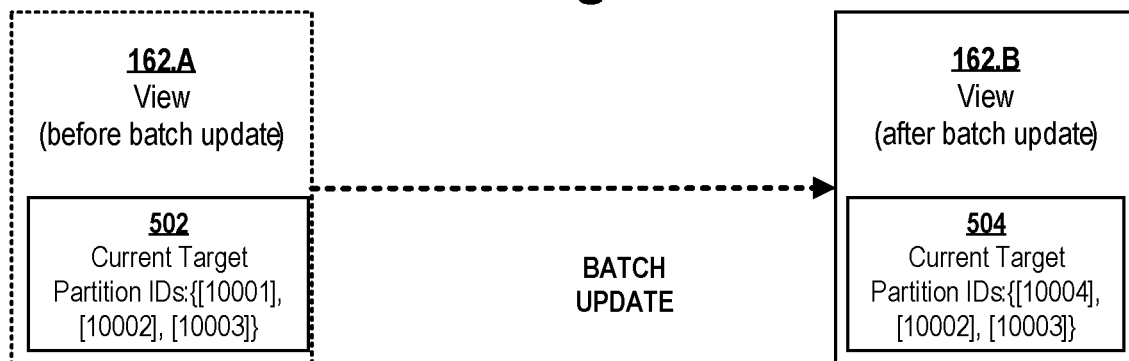
FIG. 4 depicts a mapping table wherein each source table partition ID is mapped to one or more target partition IDs.

FIG. 4 depicts a mapping table 400 wherein each source table partition ID stored in the left column is mapped to one or more target partition IDs stored in the right column of the table. The mapping stored in the mapping table 400 can be maintained, for example, by the batch update module 112 or by a module that is interoperable with the batch update module. The target table partition IDs illustrated in the right column of table 400 all belong to the second value domain used by the batch update module 112 for creating target partition IDs when performing a batch update.

According to one example embodiment, the source DBMS is IBM DB2 for z/OS and the target DBMS is IBM DB2 Analytics Accelerator (IDAA). In the table 400, the source table partitions generated by DB2 are mapped to a target table partition generated by the batch update module 112. Each new target partition ID is unique for the combination of a particular source table partition and its version. The target table partition ID is stored in the target table in Association with each individual row belonging to that particular target table partition. The assignment of target partition IDs to individual rows in the target table, the mapping of the target table partitions to respective source table partitions and data versions in mapping table 400 and the use of different value domains by the incremental update module 111 and the batch update module 112 allows to specifically control and modify the visibility of individual target table rows, thereby ensuring that any query operating on the target table will see a current, consistent state of the data.

The mapping table 400 may illustrate how the specification of the set of current target partition IDs in the view 162 can be specified by means of an SQL expression. For example, the set of current target partition IDs 302 of view 162.A can be specified with the expression "WHERE Mapped_Target_Table_Partition_ID"<=10003", whereby the expression Mapped_Target_Table_Partition_ID corresponds to the name of the right column of the mapping table 400. The set of current target partition IDs 304 of view 162.C can be specified with the expression "WHERE Mapped_Target_Table_Partition_ID"<=10004 AND Mapped_Target_Table_Partition_ID NOT IN (10001)". The column "Mapped_Target_Table_Partition_ID" of the partition table may or may not be exposed in the view's select list.

FIG. 5 depicts two states of a view respectively representing a snapshot of a target table comprising a mixture of incrementally replicated rows and rows provided in batch update operations. The two states of the view correspond to time points before and after an atomic batch update operation for storing a new target partition in the target table and assigning target partition ID 10004 to this new partition.

The target table TT1 depicted in FIG. 5 represents a more complex situation compared to FIG. 3, because the table content consists of a mixture of rows provided by the batch update module 112 and having assigned a target partition ID of the second value domain and of rows provided by the incremental update module 111 and having assigned a target partition ID of the first value domain.

In general, using both a batch update module 112 and an incremental update module 1114 keeping the content of the target table up-to-date significantly complicates matters. However, by assigning each newly created row in the target table a partition ID whose value is indicative of the update module 111, 112 having created the new row, and by updating the set of visible partition IDs specified in a view of the target database allows using the two different update approaches and respective modules without compromising consistency of the target database.

The target table TT1 which is conceptually illustrated in FIG. 5 may originally (at time t0) consist only of three partitions respectively comprising multiple rows. These three partitions have been created by the batch update module 112 and respectively have assigned target partition IDs contained in the second value domain, namely [10001], [10002], [10003]. The source table partitions from where each of said three partitions in the target table derive their content is provided in brackets. For example, target partition [10001] derives its content from source table partition ID "1". The batch update module 112 is configured to create the target partition ID by adding an offset of 1000 to the source table partition ID. For example, a copy of the data content of source table partition having ID "1" is stored in the target table with the target table partition ID of 1+1000=10001. A copy of the data content of source table partition having ID "2" is stored in the target table with the target table partition ID of 2+1000=10002. A copy of the data content of source table partition having ID "3" is stored in the target table with the target table partition ID of 3+1000=10003.

The maximum possible number of partitions in the source database may be, for example, 890 partitions.

Then, at time t1, a single new row having assigned the target partition ID "1" is created and stored in the target table by the incremental update module 111 (topmost row of the table TT1). In the depicted example, the incremental update module simply uses the source table partition ID "1" as the target partition ID. Thereby, the incremental update module propagates a change having been introduced in the source table in a single row within the source partition "1" to the target database.

In addition, at time t2, the incremental update module creates a new row in the target table having assigned target partition ID "2". Thereby, the incremental update module propagates a change having been introduced in the source table in a single row within source partition "2".

Some minutes later, at time t3, the incremental update module may create a further new row in the target table having assigned partition ID "3" and reflecting a data modification having originally been introduced in source table partition "3".

As the incremental update module 111 uses the source table partition IDs as the target table partition IDs assigned to each new row stored in the target table, and as the maximum possible number of partitions in the source database may be limited to a number that is smaller than the offset used by the batch update module for creating the target partition ID, it is ensured that partition IDs assigned to new data rows created by the incremental update module are always below 890, and partition IDs assigned to new data rows created by the batch update module 112 are always larger than thousand. Hence, the partition IDs created by the two different modules 111, 112 are elements of different value domains.

At time t4, all three incremental updates having created the three additional (topmost) rows in target table TT1 has committed and any query accessing the view 162.A can "see" the three target partitions having assigned partition ID 10001, 10002, and 10003, because these target partition IDs are contained in the set of current target partition IDs 502. In addition, any query accessing the view 162.A can "see" the three new rows in the target table having assigned partition IDs "1", "2" and "3", because these partition IDs belong to the first value domain and hence are considered per se as "current". The target partition having assigned ID 10004 does not exist yet and hence cannot be seen by any query.

At a still later time t5, e.g. a preconfigured time around midnight, the scheduling module may cause the batch update module 112 to copy the current content of source table partition "1" to the target database. The batch update module starts an atomic batch update operation during which a new target partition having assigned the target partition ID 10004 comprising a current version of the content of source partition one is created. It should be mentioned that in this case the target partition ID is computed not simply as the sum of the offset and the source partition ID (because the partition ID 10001 already exists in the target table and represents a previous version of the data content of source partition 1, but by incrementing a current maximum target partition ID value that can be maintained by the batch updating module, e.g. by a counter sub-module of the batch updating module 112. In addition, the database you 162 is updated by removing the target partition ID 10001 from the set of current target partition IDs 504 and adding the new target partition ID 10004 to the set of current target partition IDs 501 instead. In addition, during the atomic batch update operation, the ones of the rows contained in the target table which would represent duplicates after a commit of the currently executed batch update operation are "hidden" to prevent the returning of duplicated results as a consequence of the currently executed batch update. In the depicted example, a batch update operation is performed for source table partition "1". Hence, there is a risk that the topmost row of the target table depicted in FIG. 5 which comprises an incrementally updated copy of a row in the source table partition "1" returns erroneous results comprising duplicated rows. These errors are avoided by updating either the table or the view such that the individual rows in the target table having been created by the incremental update module and representing a duplication of rows contained in the source table partition that is currently copied to the target table are hidden.

According to some embodiments, the atomic batch update operation comprises identifying rows in the target table which belong to the first value domain (i.e., which have been created by the incremental update module) and which are mapped in a mapping table 400 to the same source table partition as the source table partition whose content is currently copied to the target table. Then, the partition IDs of the identified rows are modified such that they are no longer visible. For example, the partition IDs of those rows could be replaced by an outdated target partition ID of the second value domain, e.g. with the ID 10001 that will represent an outdated version of the source table partition "1" once the current batch update operation has committed and the new target partition 10004 is visible. Target partition IDs may be considered "visible" per default, so in order to hide a row in the target table, it may be sufficient to replace its target partition ID with another target partition ID which belongs to the second value domain and which in addition represents an outdated version of the data content of the respective source table partition.

For example, the replacement of the target partition ID can be implemented as an SQL command comprising a statement like UPDATE table TT1 set targetPartitionID=10001 WHERE targetPartitionID=1. If necessary, this UPDATE operation can be done incrementally with intermediate commits Using a sequence of small sized intermediate transactions significantly reduces the amount of locking and logging that has to be done for the UPDATE by the target DBMS.

According to some other embodiments, the identified rows in the target table are deleted.

The modifications in the target table (deleting row having assigned target partition ID "1" or replacing the target partition ID "1" with a target partition ID that is an outdated target partition ID once the current batch update operation commits (e.g. "10001"), the duplicate rows created in the target database by the incremental update module are hidden from the queries. This is indicated by the missing arrow between view 504 and target partition having ID "1". Moreover, in order to hide outdated partitions from the queries, the atomic batch update operation comprises modifying the view 162 by replacing in the set of current target partition IDs the ID 10001 with the ID 1004. As a consequence, the target partition 10001 is no longer visible to database queries using the view 162.B once the atomic batch update operation has committed. This is indicated by the missing arrow between view 504 and target partition having ID "10001" and by the additional arrow between the view 162.B and the target partition 10004.

According to embodiments, the "visible" target partition IDs can be defined as a union of all possible values contained in the first value domain and a selected set of target partition IDs of the second value domain which respectively represent the most current version of the data content of a respective one of the source table partition. In order to identify if the set of current target partition IDs in the view 162 comprises a target partition ID that will become outdated once the currently performed batch update operation has committed, a mapping table such as depicted in FIG. 4 has to be maintained. In order to maintain the mapping table 400, it is not necessary that the incremental update module 111 has access to the mapping table 400. It is sufficient that the batch update module 112 can access the mapping table 400 in order to update the specification of visible target partition IDs in the view accordingly. For example, the updating of the database view 162 may comprise storing, in the view, an SQL expression according to:

WHERE targetPartitionID in (<totality of possible values within first value domain> AND targetPartitionID NOT IN (<explicitly given set of partition IDs whose value is in the second value domain>).

For example, in case the first value domain is defined as a numerical value that is smaller than a maximum-possible-source-partition-ID that may possibly occur in the source database, the expression may be formulated like:

WHERE targetPartitionID<=<maximum-possible-source-partition-ID>AND targetPartitionID
NOT IN (<[10001], [ . . . ]>).

the first part of the above presented expression renders all rows in the target table visible that have assigned a target partition ID whose value is within the first value domain, e.g. is smaller than the maximum possible numbers of source partition IDs in the source database. The second part of the expression filters out target table rows having assigned a partition ID version whose value belongs to the second value domain and which represent, according to the mapping table 400, a version of the content of a source table partition that is already outdated or that will become outdated upon a commit action of the currently executed batch update operation.

As mentioned above, the incremental update module may simply use the source table partition IDs created in the source DBMS as the target partition IDs to be assigned to the rows in the target table that are newly created by the incremental update module. The batch update module 112 is configured such that it creates for each newly created partition in the target table a target table partition ID that cannot be element of the first value domain. For example, it can use offsets, prefixes or other means to ensure that no conflict and overlap of partition ID values created by the two different update modules 111 and 112 is possible. All rows produced by the incremental update module 111 will always be visible, because according to the specification of the view 162, any row in the target table having assigned a partition ID within the first value domain is considered "visible". If the incremental update module deletes a rolling the target table, it never uses the target partition ID as a criterion to identify the road to be deleted. Rather, the incremental update module 111 uses one or more other keys and key columns for identifying the rows to be deleted for bringing the target table in sync with the source table. Thus, the incremental update module 111 may delete rows in the target table having assigned a target partition ID of the first value domain and may likewise delete rows in the target table having assigned a target partition ID of the second value domain. However, when the incremental update module creates a new row in the target table, the partition ID assigned to the new row is always element of the first value domain.

Figure 6:
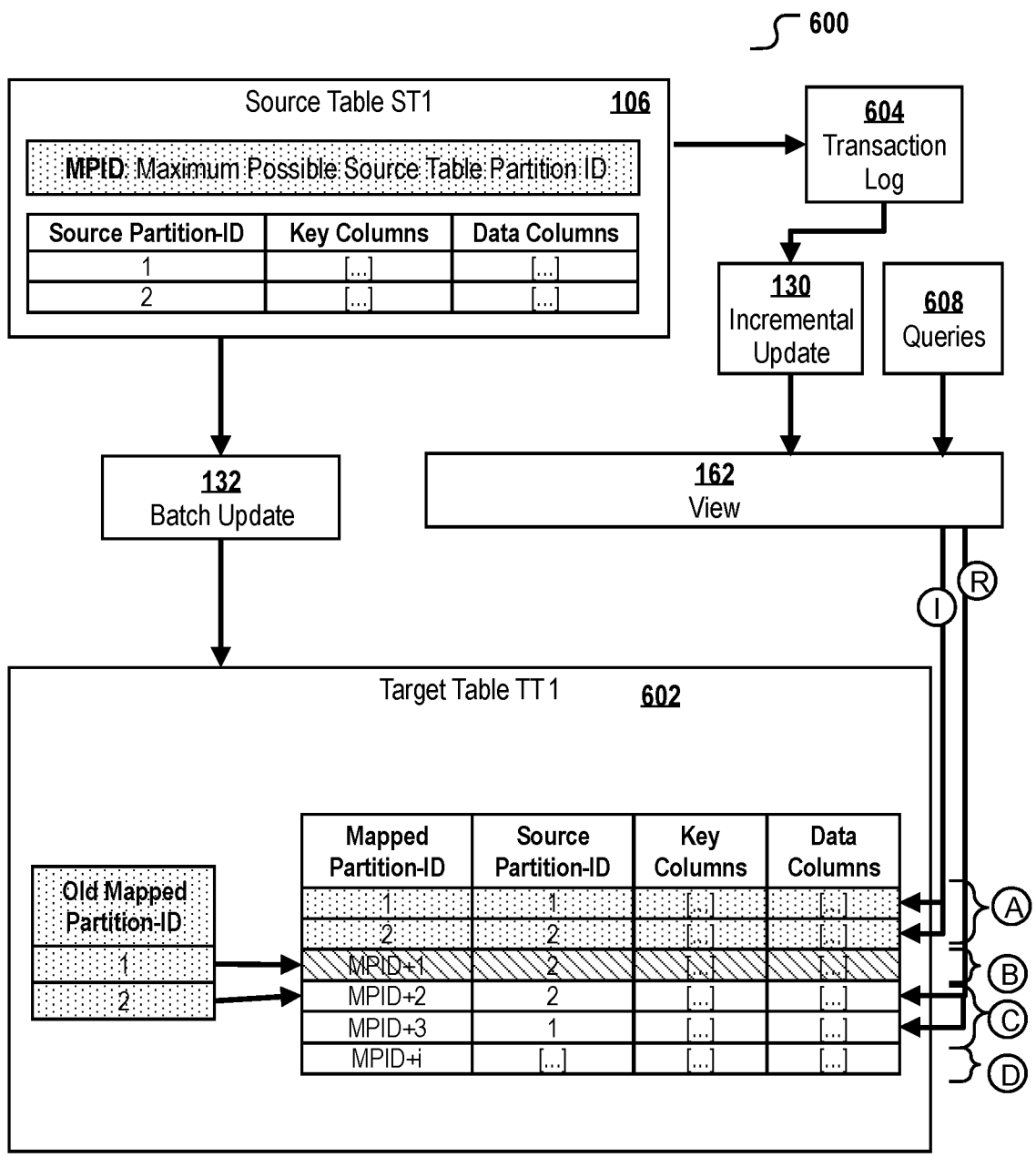
FIG. 6 depicts a system comprising a source table and a target table in greater detail.

FIG. 6 depicts a distributed system 600 comprising a source table 106 and a target table 602 in greater detail. The main objective is to keep the data content of target table TT1 602 in sync with its corresponding source table ST1 while queries 608 can be executed on target table TT1.

Two different approaches and respective modules or tools exist and are used for copying data changes originally introduced in the source table to the target table:

The batch update module 112 copies entire partitions from the source table to the target table, thereby logically replacing the previous version of the data content of copied partition in the target table, if any. In each batch update operation 132, one or more partitions of the source table are copied into the target table. The batch update module operates with large latency but causes low overheads for data extraction and bulk-processing of the data contained in the copied partitions.

The incremental batch update module 111, e.g. a conventional data synchronization tool, extracts modified rows from the database transaction log 604 of the source DBMS and applies those changes for each individual row in an incremental update process 130 to the target table. The incremental update module operates with low latency but causes large overheads for processing and copying the individual data records that have been modified in the source table such that the target table receiving the copies of the modified rows maintain consistent state.

Embodiments of the invention allow the execution of queries 608 on the target table 602 no matter which of the two different data copying approaches represented modules 111, 112 is currently performed.

According to some embodiments, the updates performed by the incremental update module 111 are supported natively by the target DBMS which hosts the target table TT1. The batch updates performed by module 122, however, are long-running processes. According to embodiments, the batch update operations involve a different transactional isolation strategy. Preferably, the batch update module 122 implements various functions related to the target partition ID creation and view updating which in effect provide for a snapshot isolation of the batch updates performed in the target DBMS even in case the target DBMS doesn't support snapshot isolation natively. This strategy involves the creation of a query view for each target table in the target database that is to be kept in sync with a respective source table. This view hides in-flight partitions that are currently created by the batch update module 122, target partitions to be created by future batch updates, and target partitions comprising outdated versions of a respective source table partition.

Each time a batch update operation of a particular target table is performed, the definition of a view that acts as a query view of this target table is updated such that that the updated version of the viewed does not only allow queries to access the updated and most recent version of the data content of a particular source table partition copied to the target table, but also allows the queries to access data changes propagated by the incremental update module 111. The updating of the view involves an analysis of a mapping table as depicted, for example, in FIG. 4 for identifying current and outdated versions of the data content of a particular source table partition. Delete operations via the view are performed on data records of the target table having assigned a target partition ID which is either contained in the first value domain or is contained in the second value domain and in addition fulfills the requirement that it represents, according to the mapping table, the most current version of the data content of a particular source table partition.

In the source database, there may exist a maximum possible number of partitions that can be created and maintained by the source DBMS. This maximum number of partition can be used for defining, according to embodiments of the invention, the maximum possible value of the first value domain. "1" may represent the minimum possible value of the first value domain. The target table depicted in FIG. 6 comprises the mapping information of source table partitions to respective target table partitions. Hence, it may not be necessary to maintain a separate mapping table 400 as depicted in FIG. 4 as the mapping information may also be stored in a further column of the target table. Thereby, the "mapped partition ID" represents the target table partition ID. Character "A" represents directly mapped partitions P1 (visible for queries and incremental inserts). Character "B" represents batch deleted partitions P2 (invisible). Character "C" represents active batch loaded partitions P3 (visible for queries and incremental deletes and character "D" represents batch loaded partitions P4 which will commit in the future and hence are invisible to currently executed queries. The target partition IDs which are stored in the target table column "Mapped partition ID" is automatically generated by incrementing the previously generated target partition ID by one each time a new target partition ID is created. The original target partition ID is created by adding 1 to MPID (the maximum possible source table partition ID). Optionally, an additional table may store the target partition IDs of target table partitions comprising an outdated version of the data content of the corresponding source table partition.

Figure 7:
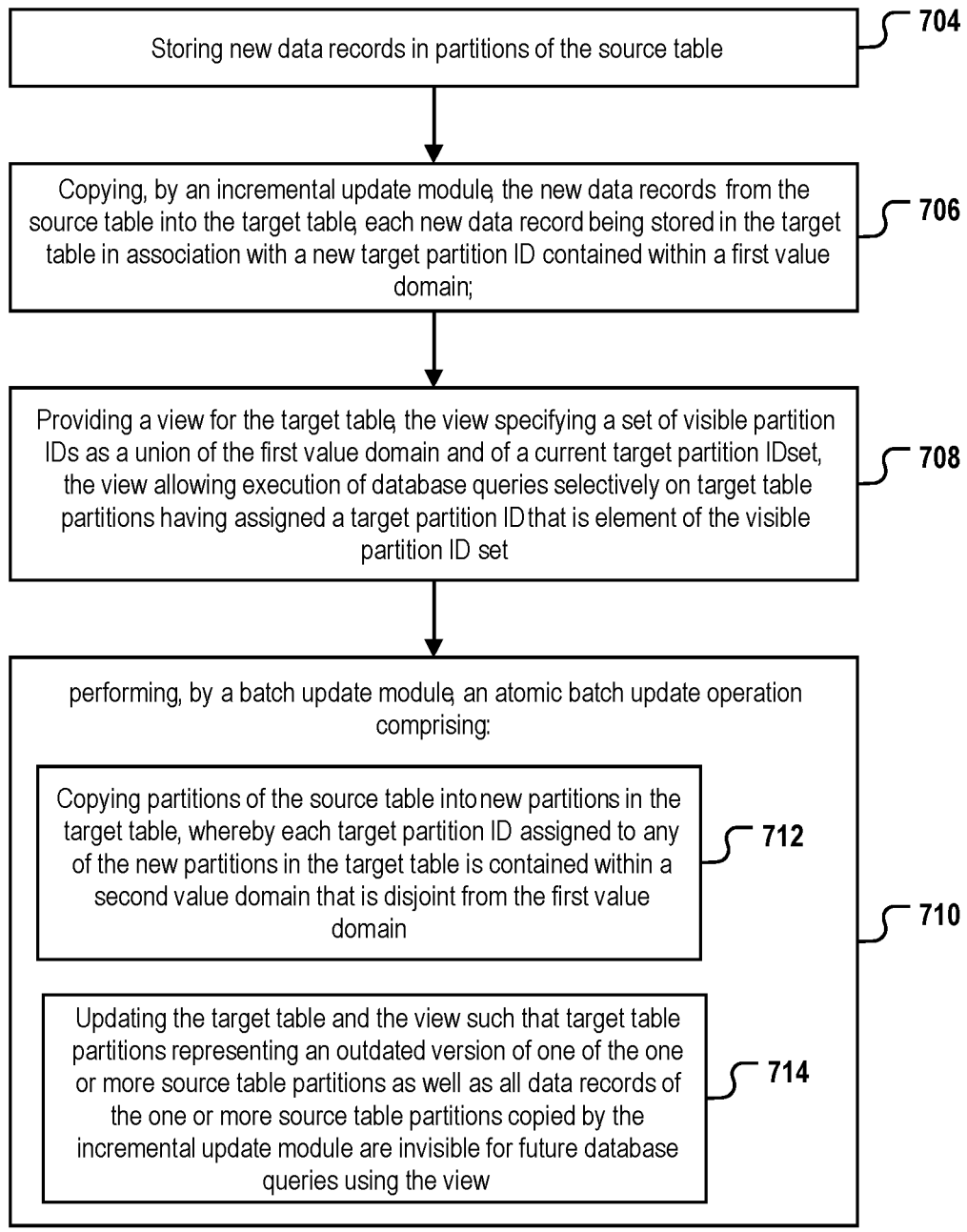
FIG. 7 shows a method of updating a target table.

FIG. 7 shows a method of updating a target table in a batch update process 132 without creating duplicate rows in combination with the rows provided by an incremental update process 130.

In step 704, which may be performed before the batch update is started, one or more new data records are stored in one or more partitions of the source table. This storing may be the result of an INSERT operation performed on a source computer system, or of an UPDATE operation that is interpreted by the source computer system as the creation of a new version of a particular row and used for generating a "derivative INSERT" query that stores a new row in the target table that represents a new version of an existing row in the source table.

Next in step 706, the incremental batch update module copies one or more of the new data records individually to the target table. Thereby, the incremental update module stores each new data record in the target table in association with a new target partition ID, whereby each target partition ID is contained within a first value domain. Typically, a data record corresponds to a single row in the target table, but it is also possible that a data record corresponds to multiple rows. For the sake of simplicity, in the following it is assumed that each row in the source table and in the target table represents a single data record.

In step 708, a view is provided for the target table, whereby database queries configured to retrieve data from the target table actually access the target table only via the view and not directly. The view specifies a set of visible partition IDs as a union of the first value domain and of a current target table partition ID set (CTTP ID set). The CTTP ID set selectively comprises the IDs of the ones of the target table partitions respectively comprising the most recent version of a respective source table partition. The view allows execution of database queries selectively on target table partitions having assigned a target partition ID that is element of the set of visible partition IDs.

The batch update module in step 710 performs an atomic batch update operation. The atomic batch update operation comprises a step 712 of copying all data records of one or more partitions of the source table into a respective new partition in the target table. To each new partition of the target table created during the batch update operation, a new target partition ID is assigned. Each of said target partition IDs is contained within a second value domain that is disjoint from the first value domain. The atomic batch update operation further comprises a step 714 of updating the target table and the view such that target table partitions representing an outdated version of one of the one or more source table partitions as well as all data records of the one or more source table partitions copied by the incremental update module are invisible for future database queries using the view.

Figure 8:
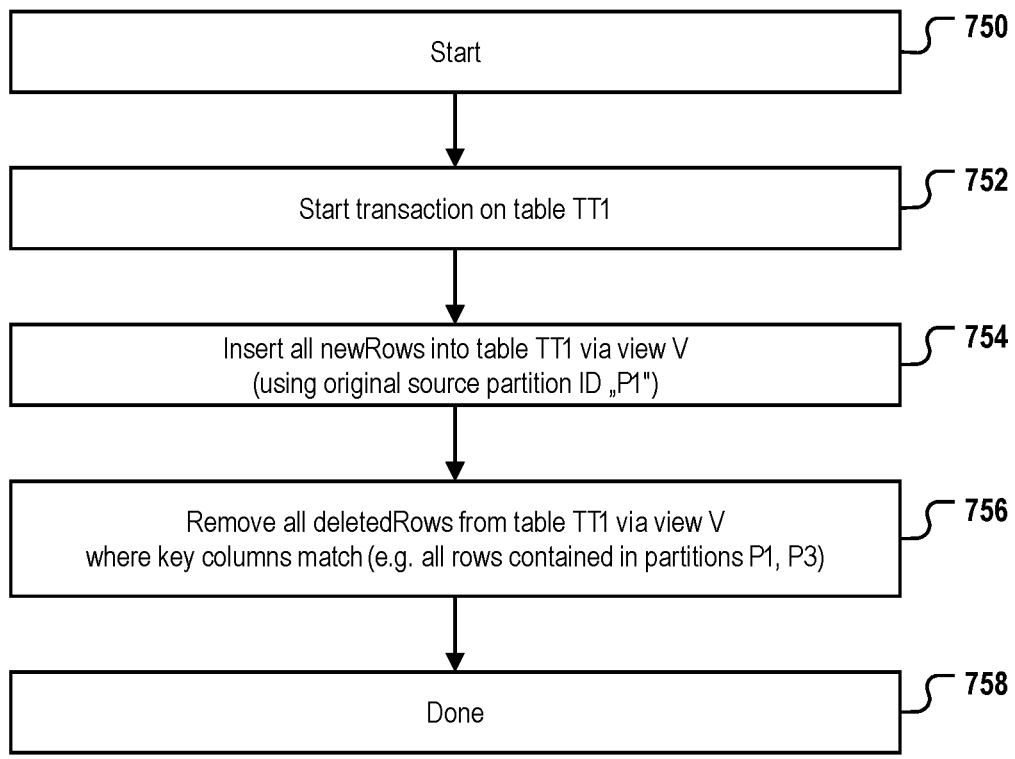
FIG. 8 shows a method of updating a target table using a batch update with incremental update process.

FIG. 8 shows a method of updating a target table using an incremental update process 130. First in step 750, the incremental update process is started for copying one or more newly created data record version having been created in the source table from the source table ST1 to the target table TT1. In step 752, a transaction is started on the target table TT1. Then in step 754, the query is actually executed on the target table TT1. For example, in the depicted case where the query comprises an INSERT operation. In step 754, all new rows which shall be inserted in the target table are stored in the target table. As the incremental update transaction depicted in FIG. 8 also comprises a DELETE statement, the DELETE action is performed in step 756, whereby the row or rows to be deleted are uniquely identified via (a set of) key columns that do not include the partition ID. That is, a single row that was uniquely identified by those attributes in source table ST1 can occur multiple times (multiple versions) in target table TT1 and the view guarantees that only the most recently committed version is visible for query processing via the view 162. Then in step 758, the incremental update operation commits.

When the incremental update process is performed, the rows in the target table that are visible to the process are automatically derived from the view definition and do not need to be explicitly expressed by the used replication tool. Rows that are affected by an update. The view 162 is preferably not only used for processing queries which have been dispatched from the source table to the target table for a faster or computationally more efficient execution on the target site, but also for processing changes by incremental updates. A mapping of source table partitions to respective target table partitions is used for identifying the ones of the target table partitions which represent the most current version of the respective source table partition. Deletes are processed over the data set that is visible for query processing, i.e., partitions belonging to category P1 and P3 mentioned in the description of FIG. 6. In some embodiments, the same view is used for dispatched query processing and for performing the incremental updates. In other embodiments, two views which are either identical or structurally and functionally highly similar are used for performing dispatched query processing on the one hand and the incremental updates on the other hand. For example, the "query view" could be identical to the view used for the incremental updates with the only difference that the former does not contain the mappedPartitionId column (i e, target partition ID column) in its select list, while the latter does. Both views have the same definition of the "visible" target table partitions. An INSERT operation of an incremental update operation can be a replicated original INSERT operation or can be generated by the incremental update module by creating, from an UPDATE operation to be performed on the source table, an INSERT statement for inserting the new version of the updated row and a DELETE statement for deleting the outdated version of the row.

Figure 9:
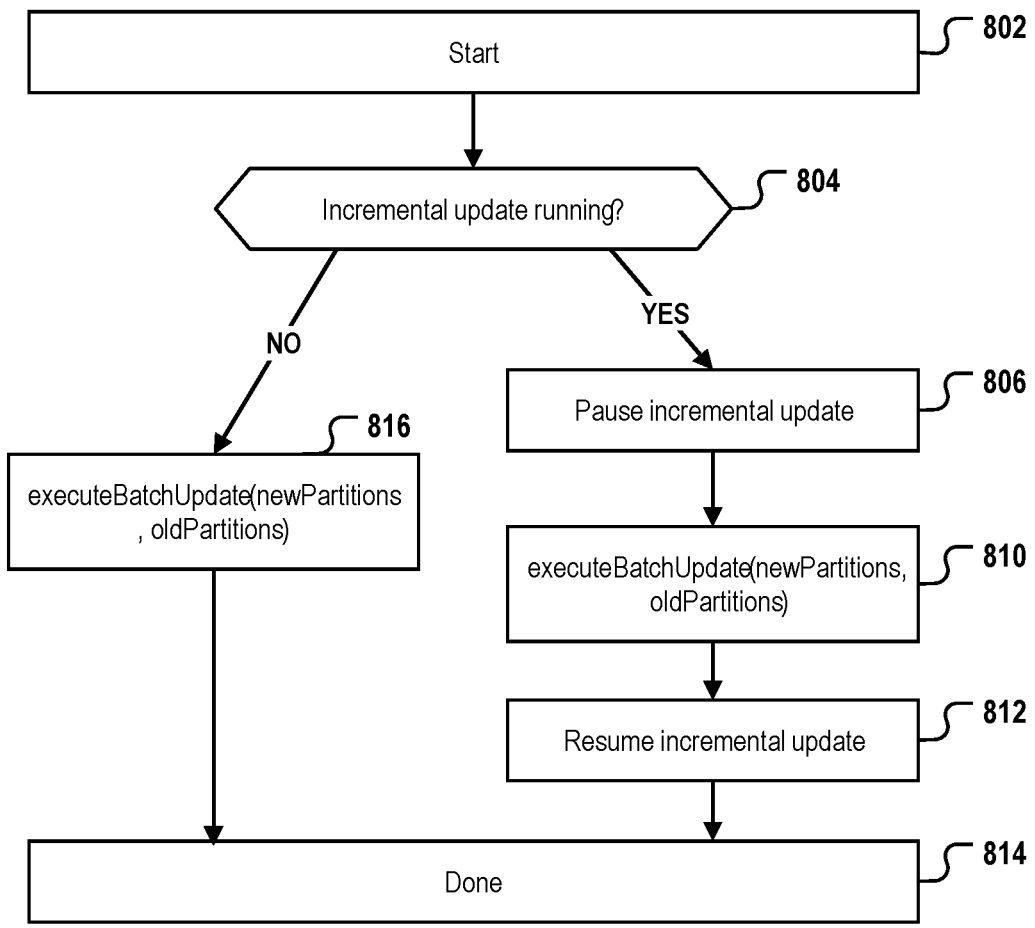
FIG. 9 shows a method of updating a target table using a batch update process.

FIG. 9 shows a method of updating a target table using a batch update process in the context of an IT framework that also used batch update processes for synchronizing the target table with the source table. The process involves the use of a scheduling module configured to pause an incremental update process for the affected table if a batch update process is to be started and to resume the incremental update process afterwards.

The process starts with step 802. Next in step 804, the scheduling module 115 checks whether an incremental update process is currently running. If this is not the case, the scheduler 115 calls the batch update module 112 and causes this module to perform the batch update process in step 816. If the scheduler determines that an incremental update is currently performed by the incremental update module 111, the scheduler causes the incremental update module 111 in step 806 to pause the currently executed incremental update and causes the batch update module 112 in step 810 to perform the batch update process. After the batch update has completed, the scheduler 115 in step 812 causes the incremental update module 111 to resume the paused processed. In step 814, the batch update process is completed. In some embodiments, the batch update process depicted in FIG. 9 is automatically performed, e.g. at predefined or dynamically and automatically determined times of low computational load of the target computer system hosting the target table.

Figure 10:
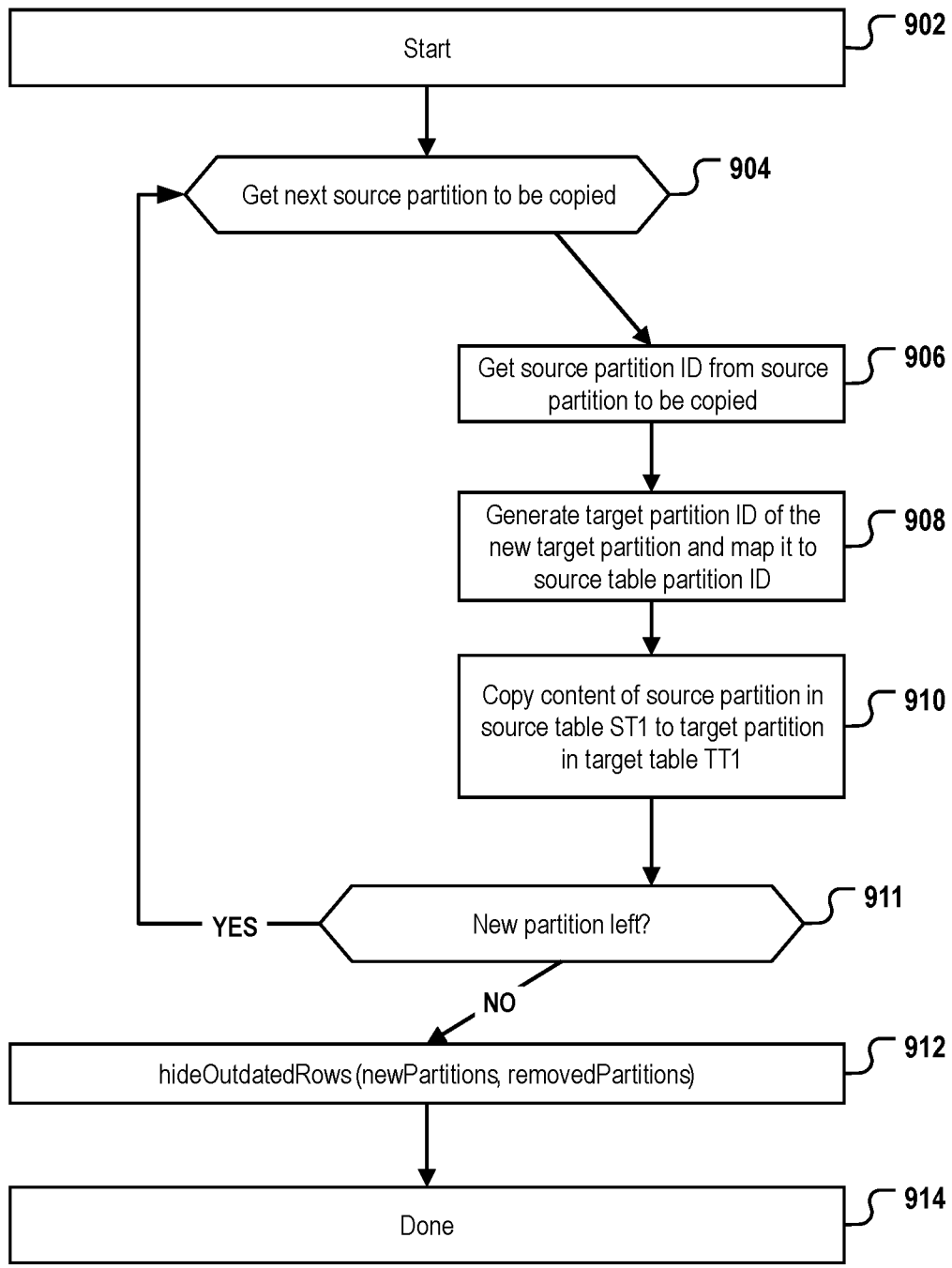
FIG. 10 shows a batch update process comprising a replacement of a target table partition ID.

The batch update operation performed in step 810 can be performed, for example, as illustrated in FIG. 10.

FIG. 10 shows a batch update process comprising a replacement of a target table partition IDs of the first value domain that are currently assigned to target table rows by target table IDs of the second value domain which represent an outdated version of the corresponding source table partition and its data.

In step 902, an atomic batch update operation is started. The process comprises determining in step 904 the one or more source table partitions whose data content is to be copied and selecting the first one of these source table partitions. For each of the one or more source table partition to be copied to the target table in the current batch update process, the partition ID ("source table partition ID") of the source table partition from where the currently copied data is derived is determined in step 906. The source table partition ID identified in step 906 belongs to a first value domain. Next in step 908, a respective target table partition ID is created ("calculated") by the batch update module 112. This newly created target partition ID belongs to a second value domain that is distinct from the first value domain. In addition, this newly created target partition ID is mapped to the source table partition ID of the source table partition acting as data source. For example, the mapping information can be stored in a separate mapping table or as an additional column of the target table or by replacing the source table partition ID that may be contained in the coped data with the target table partition ID. In step 910, the data contained in the source table partition whose partition ID was determined in step 906 is copied to and stored in the target table partition whose partition ID was created in step 908. Next in step 912, the view 612 used for performing database queries and incremental updates is updated. The view update comprising adding the new target partition ID created in step 908 to a set of "current target table partition IDs" which are specified in the view definition as "visible" target table partitions. This set is also referred to as CTTP ID set. The view update further comprises removing all other target table IDs which are mapped to the same source table partition ID identified in step 906 from the CTTP ID set, because these other target table IDs represent outdated versions of the data in the respective source table partition. This ensures that any query operating on the updated version of the view will only "see" the most recent data content of a particular source table partition in the target table, not any previously copied, outdated version of the data.

Next in step 911, the batch update module checks if a further partition is to be copied from the source table to the target table. If true, the further partition is selected in step 904 and its data content is copied as described above for steps 906-910. If all source partitions which were to be copied have already been copied in accordance with steps 906-910 to the target table, step 912 is performed.

In step 912, the batch update module hides individual rows in the target table by updating the target table. These individual rows are rows which have been copied from the source to the target table via the incremental update module. At first, all rows in the target table having assigned a target table ID whose value is in the first value domain and whose target partition ID is mapped to one of the source table partitions whose content is copied during the current atomic batch update operation to the target table are identified. Then, the identified rows are hidden from any database query to be performed after a commit of the current atomic batch update operation. The hiding is performed either by deleting the identified rows physically from the target table or by replacing the partition ID (of the first value domain) that is currently assigned to the identified rows by a partition ID of the second value domain that is mapped to an outdated version of the respective source table data. As a result, individual data rows which may represent current duplications or outdated duplications of one or more rows that are transferred to the target table in the current batch update operation are physically or logically removed from the target table as to prevent the returning of duplicated rows when a query accesses the target table via the view after a commit of the current batch update.

In step 914, the atomic current batch update operation commits Upon this commit event, the updated version of the view replaces the previous version of the view. The updated version of the view will hide all target table partitions having assigned an outdated target table partition ID from queries having started after the commit event at step 914. While the outdated versions of table partitions created by the batch update module all have a partition ID of the second value domain and are hidden by updating the CTTP ID set in the view, outdated and/or duplicated versions of individual rows created by the incremental update module all have a partition ID of the first value domain and are hidden by physically deleting these rows or by replacing the partition ID of these rows with a partition ID belonging to the second value domain that represents an outdated version of data. The vies defines only those rows and partitions of the target table as "visible" to database queries which are either element of the first value domain (without any further requirements to be fulfilled) or which are elements of the second value domain and which in addition represent the most recent version of a particular source table partition to which this target table partition is mapped.

Figure 11:
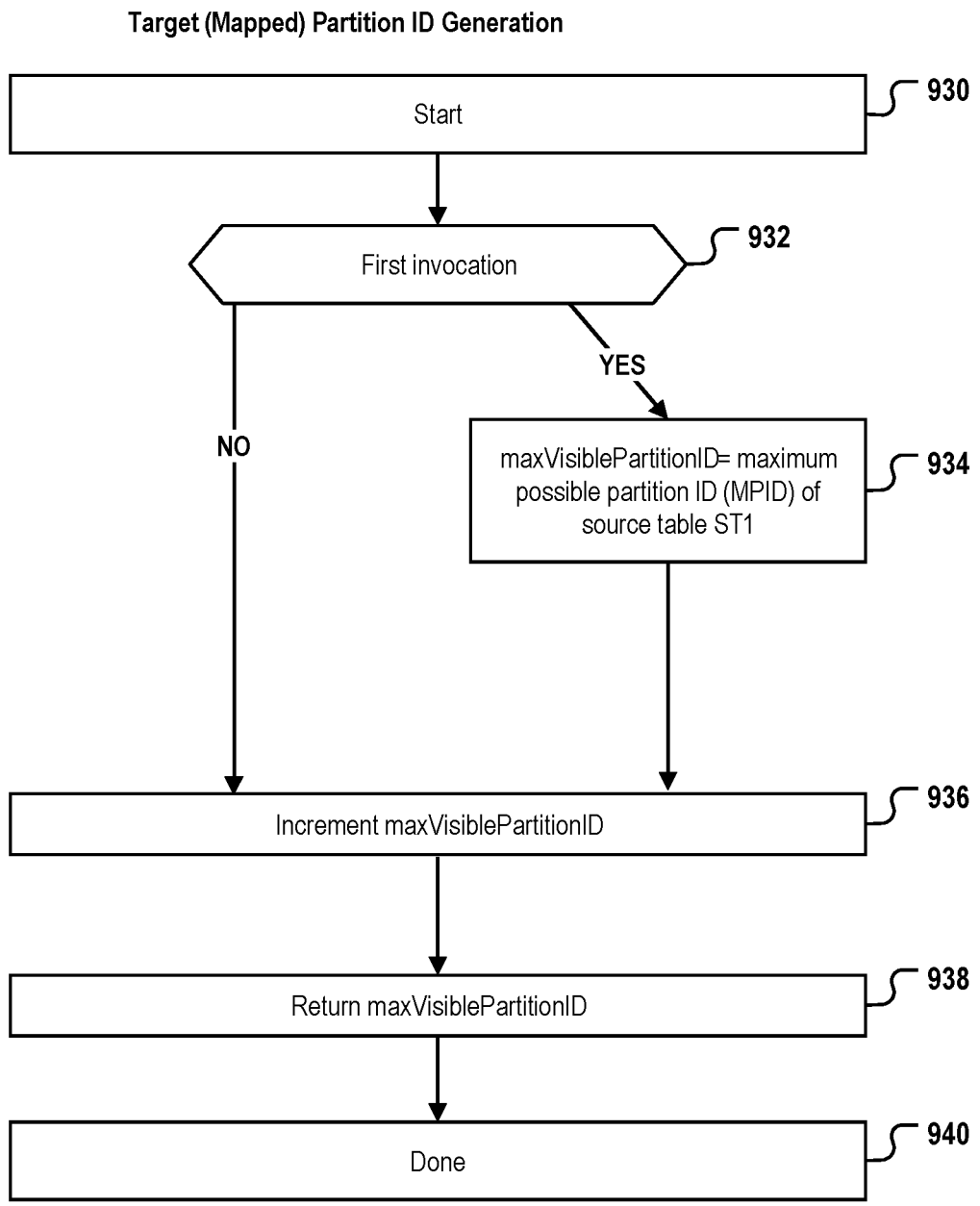
FIG. 11 shows a method of creating a target table partition ID that is mapped to a source table partition ID.

FIG. 11 shows a method of creating a target table partition ID that is mapped to a source table partition ID. The method involves the updating of a variable "maxVisiblePartitionID" representing the maximum value of target partition IDs is in the second value domain which represent a current version of a source table partition and which are element in the CTTP ID set of the view. The method can be performed by the batch update module or by an application program that is interoperable with the batch update module The method starts with step 930. Next in step 932, it is checked whether the method for creating a target table partition ID is invoked the first time.

If yes, the variable "maxVisiblePartitionID" is set to the maximum possible source table partition ID (or any numerical value that is higher than this) in step 934. For example, if DB2 for z/OS is used as the source DBMS, the source table can have at most 4096 partitions. The corresponding value to which the maxVisiblePartitionID is set upon first invocation of the method of FIG. 11 would be 4096. However, any other value greater than that, e.g. 10000, can also be used.

In step 936, the variable "maxVisiblePartitionID" is incremented. Hence, in the above mentioned example, the variable maxVisiblePartitionID would be incremented to 4097.

Next in step 938, the current value of the maxVisiblePartitionID, e.g. 4097, is returned and assigned as new target partition ID to the newly created target table partition. The method ends with step 940.

Figure 12:
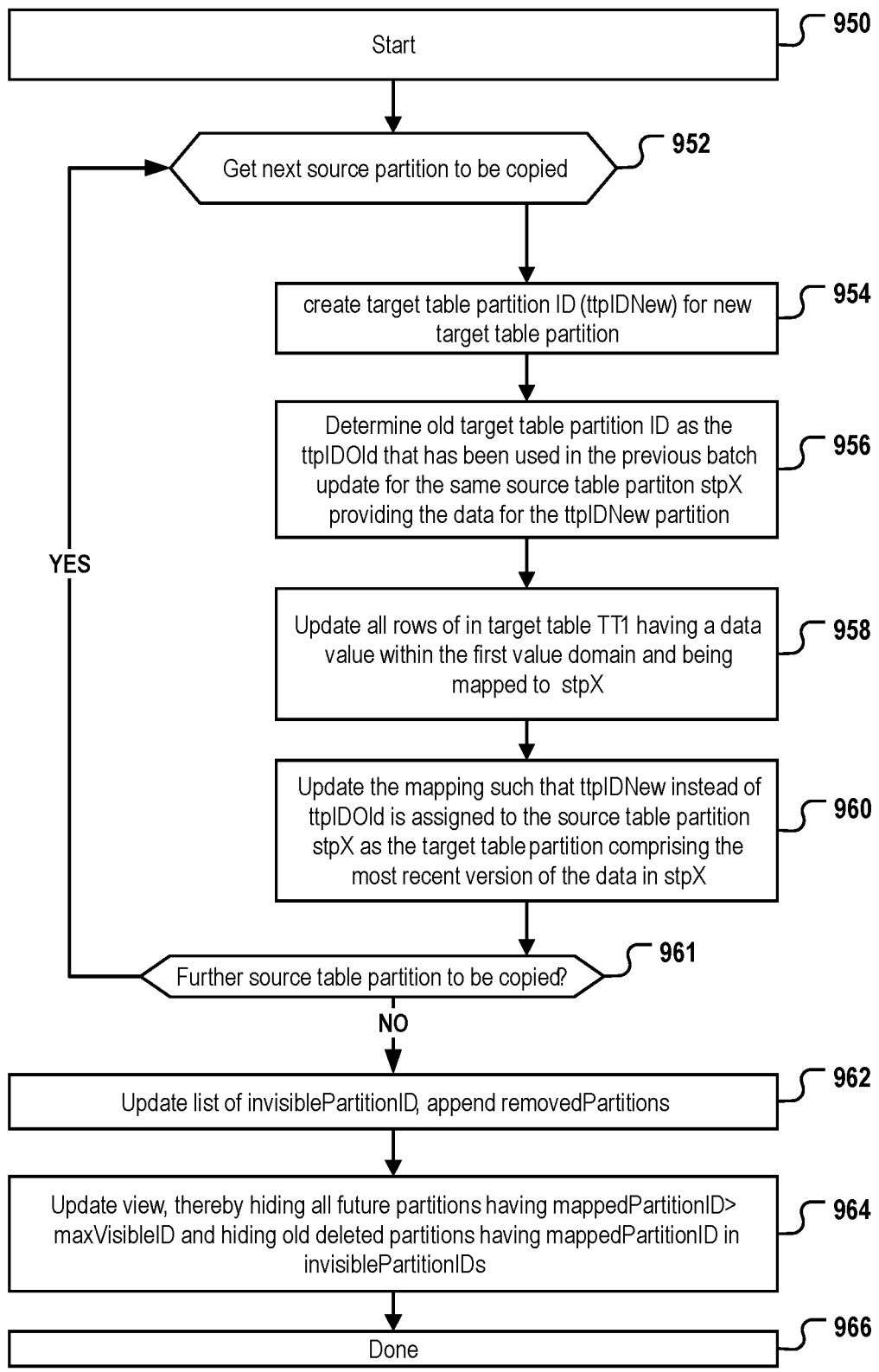
FIG. 12 shows a method of updating the target table partition ID of incrementally inserted rows.

FIG. 12 shows a method of updating the target table partition ID of incrementally inserted rows. A potential problem when combining batch update based and incremental update based data synchronization techniques is that each batch update that copies a partition of the source table ST1 to a new partition in the target table also copies those rows that have already been incrementally replicated since the last batch update. As a result, the new partition in the target table may comprise duplicates in the target table partitions (e.g. partition mapped to source table partition "1" and "3"/"4" in FIG. 6. Embodiments of the invention allow logically or physically deleting duplicate rows during a batch update operation. This process is illustrated in FIG. 12. The "hiding", i.e., logical or physical deletion of duplicate rows in the target table, is performed, for example, in an additional loop over all new batch-inserted partitions before the currently executed atomic batch update operation commits. For each partition copied from the source to the target table during the currently executed atomic batch update operation, the rows in the target table which are contained in a target table partition that is directly mapped to one of the source table partitions whose content is currently copied to the target table and which have assigned a target partition ID whose value is contained in the first value domain are "hidden", i.e., logically or physically removed before the updating of the view ("view switch") and the committing of the currently executed atomic batch update operation can happen.

As discussed above, those rows might either be deleted physically or may be assigned a target partition ID representing an outdated version of the data content of a respective source table partition and being contained in the second value domain. As discussed, the "logical deletion" of the rows by assigning them an "outdated" target table partition ID may have the advantage that it involves less computational overhead and can be performed faster. Therefore, only the partition ID re-assignment functionality is depicted in FIG. 12. This approach requires that the partition ID mapping of all currently available partitions on the one or more target tables in the target system to their respective source table partitions is maintained and continuously updated for each affected target table. The mapping indicates if a particular target partition ID identifies a target table partition that comprises the most recent data of a particular source table partition or comprises an outdated version of this data. The mapping can be stored, for example, as a separate mapping table or as an additional column of the target table. The mapping is updated each time a batch update operation is performed. The mapping is evaluated and used for identifying target partition IDs of a target partition that comprises an outdated version of the data that is currently copied in a current batch update operation to the target table in order to assign this identified "outdated" target table partition ID as "the" partition ID of the rows of the currently batch updated source table which have already been copied to the target table via the incremental update module. As a result of the replacement of the partition IDs of these identified rows with the "outdated" partition IDs in the target table, these rows now belong to a corresponding outdated target table partition. For efficiency, the update might be executed in multiple smaller-sized transactions on the target table TT1 that are separately committed. This adds some overhead per transaction but reduces the amount of required log space and the number of locks that need to be acquired.

The method of updating the partition ID of individual rows having been stored in the target table by the incremental update module begins with step 950. During an atomic batch update operation, a loop is performed over one or more source table partitions whose content is to be copied to the target table as illustrated by step 952 comprising the selection of a current source table partition to be copied to the target table. In step 954, a target table partition ID "ttpIDNew" for the new partition in the target table to be created is created as described above, e.g. by performing the method illustrated in FIG. 11. Next in step 956, the partition ID of the source table partition that comprises the data that is to be copied is determined. The determined source table partition ID of the current source table partition selected in step 952 is referred herein as "stpX". In addition, the partition ID of the target table partition where the data content of stpX has been stored in the previous batch update operation (and which represents an outdated version of the data content of stpX) is identified and is referred herein as "ttpIDOld". Next in step 958, all rows in the target table TT1 having assigned a partition ID whose value is contained in the first value domain (and hence is indicative of the row having been stored in the target table by the incremental rather than the batch update module) and whose assigned target partition ID is mapped to the source table partition stpX are updated such that they now have assigned the outdated target partition ID ttpIDOld as their "partition ID". Next in step 960, also a mapping that comprises an assignment of source table partitions to one or more target partitions having received the data content of the respectively mapped source table partition is updated. The updating of the mapping comprises assigning the new target table partition ID ttpIDNew to the source table partition stpX for indicating that as a result of the atomic update operation, the target table partition with the identifier ttpIDNew rather than the target table partition with the identifier ttpIDOld comprises the most recent version of the data content of the source table partition stpX. Next in step 961, the method comprises checking if a further one of the source table partitions is to be copied to the target table.

If yes, the steps 952-960 are repeated for the identified further source table partition.

If no, a list of invisible (outdated) partition IDs is updated in step 962 by appending the partition IDs of target table partitions comprising outdated versions of the data content of the one or more source table partitions having been copied to the target table in the current atomic batch update operation.

Next in step 964, the database view 162 is updated such that target table partitions whose data content will represent an outdated version of one of the source table partitions that are currently copied to the target database after a commit of the current atomic batch update operation are removed from the set of currently visible target table partition IDs. This step can comprise using the target partition IDs having been added to the list of invisible (outdated) partition IDs in step 962 for updating the view predicate that hides any row having assigned one of the IDs contained in the invisible (outdated) partition ID list.

It should be noted that the order of the steps may be different in other embodiments. For example, the copying of the data, the updating of the view, the updating of the mapping, and the replacement of the partition IDs assigned to respective rows in the target table might be executed in parallel or in any combinatorically possible sequential order. The execution just has to be synchronized upon the final commit event of the atomic batch update operation, where all steps need to be finished.

The incremental update module can be configured for the frequent electronic copying of data from a source database in one computer or server to a database in another so that all users share the same level of information. The result is a distributed database in which users can quickly access data relevant to their tasks without interfering with the work of others. Numerous elements contribute to the overall process of creating and managing database replication.

According to some embodiments, the target DBMS can be IBM DB2 Analytics Accelerator (IDAA). The source DBMS can be, for example, DB2 for z/OS.

A "database" as used herein is a collection of electronic information ("data") that is organized in memory or on a non-volatile storage volume in the form of a particular, defined data structure which supports or is optimized for data retrieval by a particular type of database query. The data is typically logically organized in database tables. A database can in particular be a relational database, e.g. a column-oriented database or a row-oriented database.

A "database management system (DBMS)" as used herein is a software application designed to allow the definition, creation, querying, update, and administration of databases. Examples for DBMSs are IBM DB2 for z/OS, MySQL, PostgreSQL and others.

A "database query" or "query" as used herein is a command to retrieve data from a DBMS, the command being specified in the syntax of the interface of the DBMS.

A "transaction" as used herein is a database query that comprises one or more database statements and that is processed according to the ACID (atomicity, consistency, isolation, durability) principles.

A "lock" as used herein is a mechanism of a DBMS for enforcing limits on access to a resource in a database where there are many threads of execution. A lock is designed to enforce a defined concurrency control policy. Within a database, locks can be granted over a database or over different database resources, e.g. tables, partitions, segments, blocks and rows. Locks can be of different types. Some non-limiting examples are read locks (when a resource is read, a read lock may be used to prevent an update of the resource data while the resource data is being retrieved), write locks (when a resource is updated, a write lock may be used to prevent processes relating to other commands from reading or updating the resource data at the same time; when a new resource is added, a write lock may be used to prevent processes of other commands from adding or using the same resource at the same time), etc.

A "database log" or "log" as used herein is a data object, e.g. a text file, that contains a history of significant database events and optionally also parameter settings. The log file may include, for example, startup parameter settings, the date and time of startup and shutdown, system error messages and an indication when and where changes were introduced in a database. In some cases, also the content of the amendment (e.g. the full INSERT, UPDATE or DELETE statement that introduced the amendment) is contained in the log. Logs are used, for example, to trace events preceding database crashes.

An "assignment" as used herein is a physical representation of a logical mapping of two objects. For example, an assignment can be represented in the form of a file or a database table wherein IDs of objects to be assigned are stored in the same row.

A "table" as used herein is a database table managed by a DBMS.

A "view" or "database view" as used herein is a data structure comprising a pre-defined, stored query on the data of one or more database tables, which the database users can query just as they would in a persistent database collection object. This pre-established query is kept in the database dictionary. Unlike ordinary base tables in a relational database, a view does not form part of the physical schema: as a result set, it is a virtual table computed or collated dynamically from data in the database when access to that view is requested. Changes applied to the data in a relevant underlying table are reflected in the data shown in subsequent invocations of the view.

A "module" as used herein is a piece of hardware, firmware, software or combinations thereof configured to perform a particular function within an information-technology (IT) framework. For example, a module can be a standalone software application, or a sub-module or sub-routine of a software application comprising one or more other modules.

The term "atomic" as used herein means that all sub-steps contained in an atomic operation are either all performed and finally committed or, of only a single sub-step fails, are all rolled back. An "atomic" operation is an operation whose su-steps are all performed according to the "all or nothing" principle.

A 'partition ID' as used herein is a data value that is assigned to a partition of a database table and that is unique for this partition within the table. For example, a partition ID can be a numerical value, a hexadecimal character string, a timestamp, a transaction ID or the like.

A 'partition' as used herein is a set of data records in a table having assigned the same partition ID. It is thus a logical and—in some embodiments—also a physical unit of data that can be processed by partition-based operations if such operations are supported by a DBMS. By taking advantage of data partitioning, data in a DBMS may be managed more efficiently while delivering optimum database performance. One advantage to using the counter values of the table as partition-IDs may be that only relevant data partitions are accessed during query execution; because the optimizers of many DBMS, e.g. of DB2, are data-partition aware, only relevant data partitions are scanned to resolve a query, resulting in fewer I/Os and higher query performance Another advantage may be that new partitions can easily be added to increase the table range or existing tables containing data can easily be attached (rolled in), while partitions containing old or obsolete data can be removed (rolled out) and archived, for example, to meet company policies or federal laws that mandate record retention. Preferably, a "partition" is generated by horizontally partitioning a table.

Moreover, the process of adding or deleting rows in a partition can be parallelized so that multiple threads operate on a single partition, without requiring an expensive locking and coordination protocol (like 2-phase commit) between them.

Embodiments of the invention making use of the partitioning functionality of DBMS may allow lock-based systems to deal with very large partition sizes (in the giga- and terabyte range). However, embodiments of the invention are not limited to lock-based DBMSs. For example, the source DBMS and/or the target DBMS may not natively support partitioning. In this case, the portion creation and management is performed in the application layer, e.g. by the batch update module.

In one embodiment, the partition size is limited to 1, so that every row is assigned a different counter value that acts as a partition-ID. In this case, snapshot isolation is provided on the level of individual rows, and the proposed partition-level operations add, replace and delete would correspond to the row-level operations INSERT, UPDATE and DELETE respectively.

According to embodiments, at least some of the partitions of the table are stored in different tablespaces on different physical hard drives. Thus, an additional performance gain may be achieved.

According to embodiments the target DBMS is a DBMS comprising an inbuilt table partition-based bulk delete functionality.

A "table partition-based bulk delete functionality" as used herein is a delete operation that physically deletes one or more data records in a single step.

According to embodiments, the partition-based bulk delete functionality uses a zone-map table created for each table for physically deleting multiple data records having assigned a counter value corresponding to a committed, outdated transaction that is not contained in a set of particular partition ID in any view of the database. Using a zone-map function makes row-by-row evaluation (and elimination) largely unnecessary, thereby increasing deletion performance.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Possible combination of features described above can be the following:

Feature combination FC1: a feature combination comprising the features of claim 1.
Feature combination FC2: a feature combination comprising the features of claims 1 and 2.
Feature combination FC3: a feature combination comprising the features of claims 1 and 3.
Feature combination FC4: a feature combination comprising the features of claims 2 and 4 or of claims 3 and 4.
Feature combination FC5: a feature combination comprising the features of claim 5 and of any one of feature combinations FC1-FC4.
Feature combination FC6: a feature combination comprising the features of claim 6 and of any one of feature combinations FC1-FC5.
Feature combination FC7: a feature combination comprising the features of claim 7 and of any one of feature combinations FC1-FC6.
Feature combination FC8: a feature combination comprising the features of claim 8 and of any one of feature combinations FC1-FC7.
Feature combination FC9: a feature combination comprising the features of claim 9 and of any one of feature combinations FC1-FC8.
Feature combination FC10: a feature combination comprising the features of claim 10 and of any one of feature combinations FC1-FC9.
Feature combination FC11: a feature combination comprising the features of claim 11 and of any one of feature combinations FC1-FC10.
Feature combination FC12: a feature combination comprising the features of claim 12 and of any one of feature combinations FC1-FC11.
Feature combination FC13: a feature combination comprising the features of claim 12 and of claim 13.
Feature combination FC14: a feature combination comprising the features of claim 14 and of any one of feature combinations FC1-FC13.
Feature combination FC15: a feature combination comprising the features of claim 15 and of any one of feature combinations FC1-FC14.
Feature combination FC16: a feature combination comprising the features of claim 16 and of any one of feature combinations FC1-FC15.
Feature combination FC17: a feature combination comprising the features of claim 17 and of any one of feature combinations FC1-FC16.
Feature combination FC18: a feature combination comprising the features of claim 18 and of any one of feature combinations FC1-FC17.
Feature combination FC19: a feature combination comprising the features of claim 19 and of any one of feature combinations FC1-FC18.
Feature combination FC19: a feature combination comprising the features of claim 19. In addition, the features of FC19 can be combined with the features of any one of claims 2-18.
Feature combination FC20: a feature combination comprising the features of claim 20. In addition, the features of FC20 can be combined with the features of any one of claims 2-18.

The invention claimed is:
1. A computer-implemented method for updating a target table (T1T) with changes introduced into a source table (T1S), the target table being managed by a DBMS, the source table comprising a plurality of partitions respectively having assigned a source partition ID, the method comprising:
    storing one or more new data records in one or more partitions of the source table;
    copying, by an incremental update module, the new data records from the source table into the target table, thereby storing a respective new data record in the target table in association with a new target partition ID, whereby each target partition ID is contained within a first value domain;
    providing a view for the target table, the view specifying a set of visible partition IDs as a union of the first value domain and of a current target table partition ID set (CTTP ID set), the CTTP ID set selectively comprising the IDs of the ones of the target table partitions respectively comprising the most recent version of a respective source table partition, the view allowing execution of database queries selectively on target table partitions having assigned a target partition ID that is element of the set of visible partition IDs;
    performing, by a batch update module, an atomic batch update operation comprising:
        copying all data records of one or more partitions of the source table into a respective new partition in the target table, and assigning to each new partition of the target table created during the batch update operation a new target partition ID, whereby each of said target partition IDs is contained within a second value domain that is disjoint from the first value domain;
    updating the target table and the view based on the target partition IDs such that target table partitions representing an outdated version of one of the one or more source table partitions as well as all data records of the one or more source table partitions copied by the incremental update module are invisible for future database queries using the view.
2. The computer-implemented method of claim 1, the updating of the target table and the view comprising:
    identifying all data records in the target table having assigned a partition ID contained in the first value domain;
    deleting the identified data records from the target table; and
    updating the view such that the set of visible partition IDs is a union of the first value domain and of an updated CTTP ID set, the updated CTTP ID set comprising the target partition IDs created in a batch update operation, the updated CTTP ID set being free of target table partition IDs whose respective target table partitions represent outdated versions of the one or more source table partitions.
3. The computer-implemented method of claim 1, the updating of the target table and the view comprising:
    identifying all data records in the target table having assigned a partition ID contained in the first value domain;
    replacing the partition-ID assigned to the identified data records with a partition ID of one of the target table partitions representing an outdated version of the corresponding source table partition; and
    updating the view such that the set of visible partition IDs is a union of the first value domain and of an updated

CTTP ID set, the updated CTTP ID set comprising the target partition IDs created in a batch update operation, the updated current target partition ID set being free of target table partition IDs whose respective target table partitions represent outdated versions of the one or more source table partitions.

4. The computer-implemented method of claim 2, the updating of the view comprising:
removing, from the CTTP ID set of the view, all target table partition IDs which represent target table partitions whose content will become outdated upon a commit of the current batch update operation, thereby creating the updated CTTP ID set that is to act as the CTTP ID set of the view after the commit of the current batch update operation.

5. The computer-implemented method of claim 1,
the first value domain being a range of source table partition IDs that can potentially be assigned to the source table partitions,
the second value domain being created by adding an offset to the lowest and highest limits of the first value domain, the offset being larger than the absolute amount of the first value domain.

6. The computer-implemented method of claim 1,
the first value domain being below a predefined threshold value, in particular "0", the second value domain being above the predefined threshold value; or
the first value domain being above a predefined threshold value, in particular "0", the second value domain being below the predefined threshold value.

7. The computer-implemented method of claim 1,
the first value domain consisting of even numbers, the second value domain consisting of odd values; or
the second value domain consisting of even numbers, the first value domain consisting of odd values.

8. The computer-implemented method of claim 1, the copying of the new data records by the incremental update module being performed such that each individual new data record is replicated to the target table according to the "all or nothing principle".

9. The computer-implemented method of claim 1, the method further comprising:
maintaining, by the batch update module, a mapping comprising assignments of source table partition IDs and target table partition IDs, each assignment indicating that the target table partition represents a particular version of the assigned source table partition, the mapping indicating, for each of the source table partitions, the one of the target table partitions comprising the most recent version of the source table partition.

10. The computer-implemented method of claim 1, the DBMS being a DBMS that:
lacks an inbuilt support for managing transactions in accordance with the snapshot isolation level; and/or
lacks an inbuilt support for managing transactions in accordance with the ACID characteristics; and/or
does not support multi version concurrency control.

11. The computer-implemented method of claim 1,
the DBMS managing the target table being a target DBMS configured to store and manage a plurality of target tables contained in a target database,
the source table and a plurality of further source tables being contained in a source database and being managed by a source DBMS,
the source DBMS and the target DBMS being speed-optimized for different types of queries,
the method further comprising:
receiving, by a query dispatcher module, a query directed at the source table;
analysing, by the query dispatcher module, the received query and
dispatching the analysed query to the target DBMS for execution on the target table instead of the source table without interrupting the incremental update module.

12. The computer-implemented method of claim 1, further comprising:
coordinating the batch update module and the incremental update module such that data changes introduced in the source tables in the source database are propagated to the data content of respective target tables in the target database using the batch update module at particular time intervals and using the incremental update module during the rest of the time.

13. The computer-implemented method of claim 12, the particular time intervals being scheduled time intervals or being dynamically determined time intervals of low computational load of the DBMS.

14. The computer-implemented method of claim 1, the view being used by database queries for accessing the data content of the target table and by the incremental update module for inserting individual data records retrieved from the source table into the target table.

15. The computer-implemented method of claim 1, further comprising:
before starting performing of the atomic batch update, checking if an incremental update process is performed by the incremental update module;
if an incremental update process is determined to being performed, pausing the incremental update process and starting the performing of the atomic batch update;
if no incremental update process is determined to being performed, immediately starting the performing of the atomic batch update;
after completion of the atomic batch update process, resuming the paused incremental batch update, if any.

16. The computer-implemented method of claim 1, further comprising:
analysing the frequency of write operations performed in each of the source table partitions;
Identifying a first and a second sub-set of source table partitions, the partitions of the first subset being subject to a higher write access frequency than the partitions of the second subset;
Performing, by the batch update module, a batch update of the source table partitions in the first subset more frequently than of those in the second subset.

17. The computer-implemented method of claim 1, each state of a view corresponding to a logical snapshot of the table and to a specific set of visual partition IDs that determines which ones of the data records of the target table can be accessed by a database query.

18. The computer-implemented method of claim 1, the method further comprising: regularly deleting, by an asynchronous deletion functionality, all data records stored in the target table in association with a partition-ID belonging to the first set of partition IDs or representing an outdated version of the data in the corresponding source table partition are deleted in a single bulk delete operation.

19. A computer program product for updating a target table with changes introduced into a source table, the target table being managed by a DBMS, the source table comprising a plurality of partitions respectively having assigned a source partition ID, the computer program product comprising a computer readable storage medium having program instructions embodied therewith, the program instructions executable by a processor to cause the processor to execute the method comprising:

storing one or more new data records in one or more partitions of the source table;

copying, by an incremental update module, the new data records from the source table into the target table, thereby storing a respective new data record in the target table in association with a new target partition ID, whereby each target partition ID is contained within a first value domain;

providing a view for the target table, the view specifying a set of visible partition IDs as a union of the first value domain and of a current target partition ID set, the current target partition ID set selectively comprising the IDs of the ones of the target table partitions respectively comprising the most recent version of a respective source table partition, the view allowing execution of database queries selectively on target table partitions having assigned a target partition ID that is element of the visible partition ID set;

performing, by a batch update module, an atomic batch update operation comprising:

copying all data records of one or more partitions of the source table into a respective new partition in the target table, and assigning to each new partition of the target table created during the batch update operation a new target partition ID, whereby each of said target partition IDs is contained within a second value domain that is disjoint from the first value domain;

updating the target table and the view based on the target partition IDs such that target table partitions representing an outdated version of one of the one or more source table partitions as well as all data records of the one or more source table partitions copied by the incremental update module are invisible for future database queries using the view.

20. A computer system comprising:

a source table comprising a plurality of data records, the source table being partitioned into multiple source table partitions respectively having assigned a source partition ID;

a target table comprising a plurality of data records created by updating the target table with changes originally introduced into the source table;

a DBMS adapted to manage the target table an incremental update module configured to copy new data records from the source table into the target table, thereby storing a respective new data record in the target table in association with a new target partition ID, whereby each target partition ID is contained within a first value domain;

a view for the target table, the view specifying a set of visible partition IDs as a union of the first value domain and of a current target partition ID set, the current target partition ID set selectively comprising the IDs of the ones of the target table partitions respectively comprising the most recent version of a respective source table partition, the view allowing execution of database queries selectively on target table partitions having assigned a target partition ID that is element of the visible partition ID set;

a batch update module configured to perform an atomic batch update operation comprising:

copying all data records of one or more partitions of the source table into a respective new partition in the target table, and assigning to each new partition of the target table created during the batch update operation a new target partition ID, whereby each of said target partition IDs is contained within a second value domain that is disjoint from the first value domain;

updating the target table and the view based on the target partition IDs such that target table partitions representing an outdated version of one of the one or more source table partitions as well as all data records of the one or more source table partitions copied by the incremental update module are invisible for future database queries using the view.

* * * * *